US008060742B2

(12) United States Patent
Horgan et al.

(10) Patent No.: US 8,060,742 B2
(45) Date of Patent: *Nov. 15, 2011

(54) METHOD AND APPARATUS FOR SECURE COMMUNICATIONS

(75) Inventors: Michael J. Horgan, Sacramento, CA (US); Tim Allen, Sacramento, CA (US); Michael Gardiner, Las Vegas, NV (US); Terri McGill, Roseville, CA (US)

(73) Assignee: Synectic Design, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,613

(22) Filed: May 4, 2010

(65) Prior Publication Data
US 2010/0275011 A1 Oct. 28, 2010

Related U.S. Application Data

(63) Continuation of application No. 08/908,994, filed on Aug. 8, 1997, now Pat. No. 7,743,247.

(51) Int. Cl.
*H04L 29/06* (2006.01)

(52) U.S. Cl. .................................. 713/155; 455/411
(58) Field of Classification Search .......... None
See application file for complete search history.

(56) References Cited

U.S. PATENT DOCUMENTS

| 5,249,230 | A | 9/1993 | Mihm, Jr. |
| 5,283,829 | A | 2/1994 | Anderson |
| 5,301,246 | A | 4/1994 | Archibald et al. |
| 5,428,745 | A | 6/1995 | de Bruijn et al. |
| 5,455,863 | A | 10/1995 | Brown et al. |
| 5,491,750 | A | 2/1996 | Bellare et al. |
| 5,491,752 | A | 2/1996 | Kaufman et al. |
| 5,613,012 | A | 3/1997 | Hoffman et al. |
| 5,742,596 | A | 4/1998 | Baratz et al. |
| 6,070,243 | A | 5/2000 | See et al. |
| 6,446,206 | B1 | 9/2002 | Feldbaum |
| 7,743,247 | B1 | 6/2010 | Horgan et al. |

OTHER PUBLICATIONS

Schneier, B.—Applied Cryptography—John Wiley & Sons Inc., Second Edition, 1996, pp. 516.

*Primary Examiner* — Benjamin Lanier
(74) *Attorney, Agent, or Firm* — John P. O'Banion

(57) ABSTRACT

The present invention provides a method and apparatus for a trusted service provider (TSP) which assists with the secure exchange of data across the public switched telephone network. Communications are routed via a TSP, which uses cryptographic techniques to conceal the identities (e.g., telephone numbers) of the call initiator and call recipient, thereby preventing traffic analysis attacks. The TSP also performs cryptographic handshakes with the call initiator and call recipient to authenticate callers. The TSP further provides cryptographic keying material which communicants may use to help protect communications and to directly authenticate and identify each other. Although the TSP is trusted to negotiate the connection and is involved in the process, the communicants can perform their own key agreement and authentication for protecting data routed via the TSP.

35 Claims, 17 Drawing Sheets

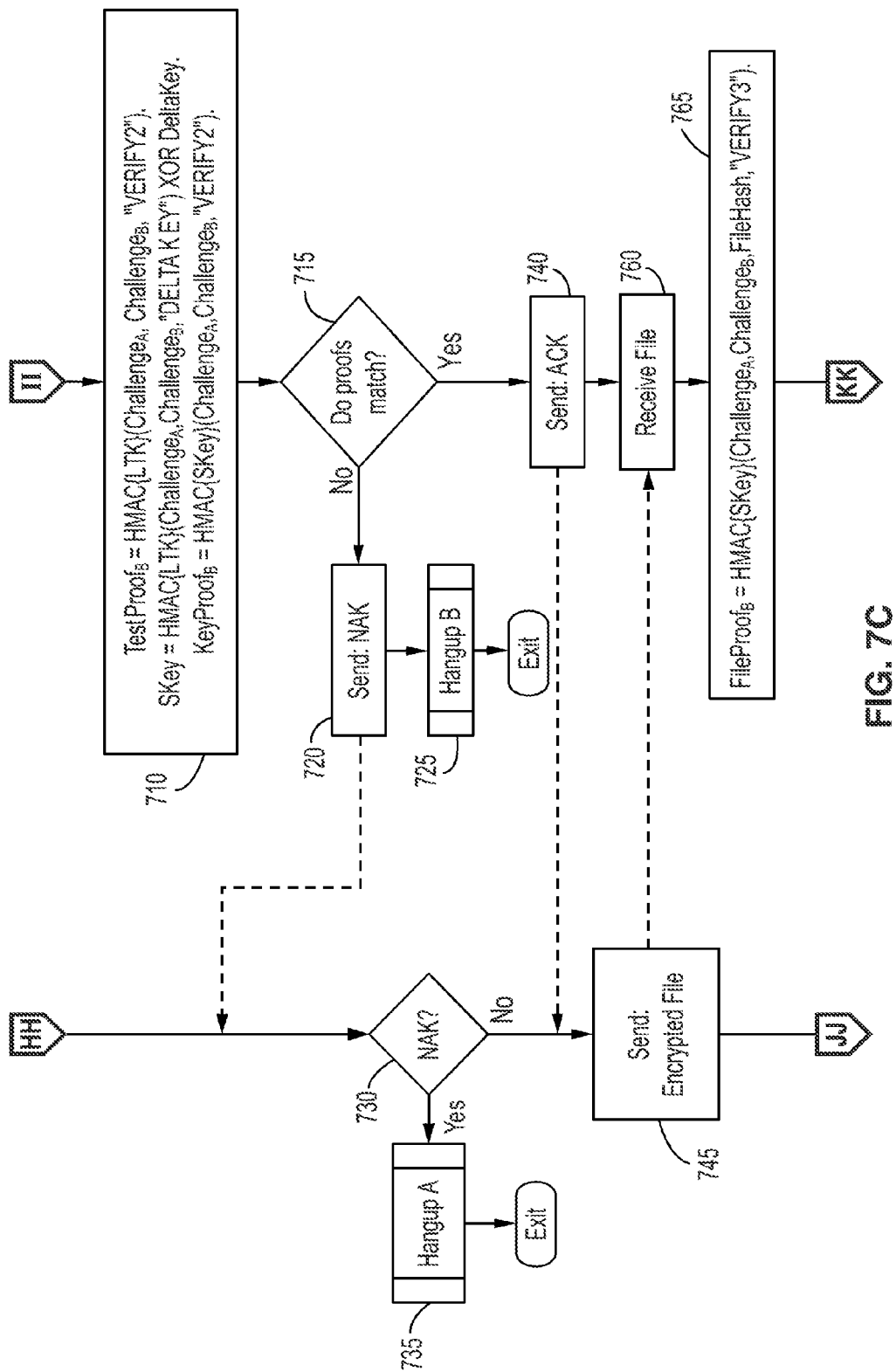

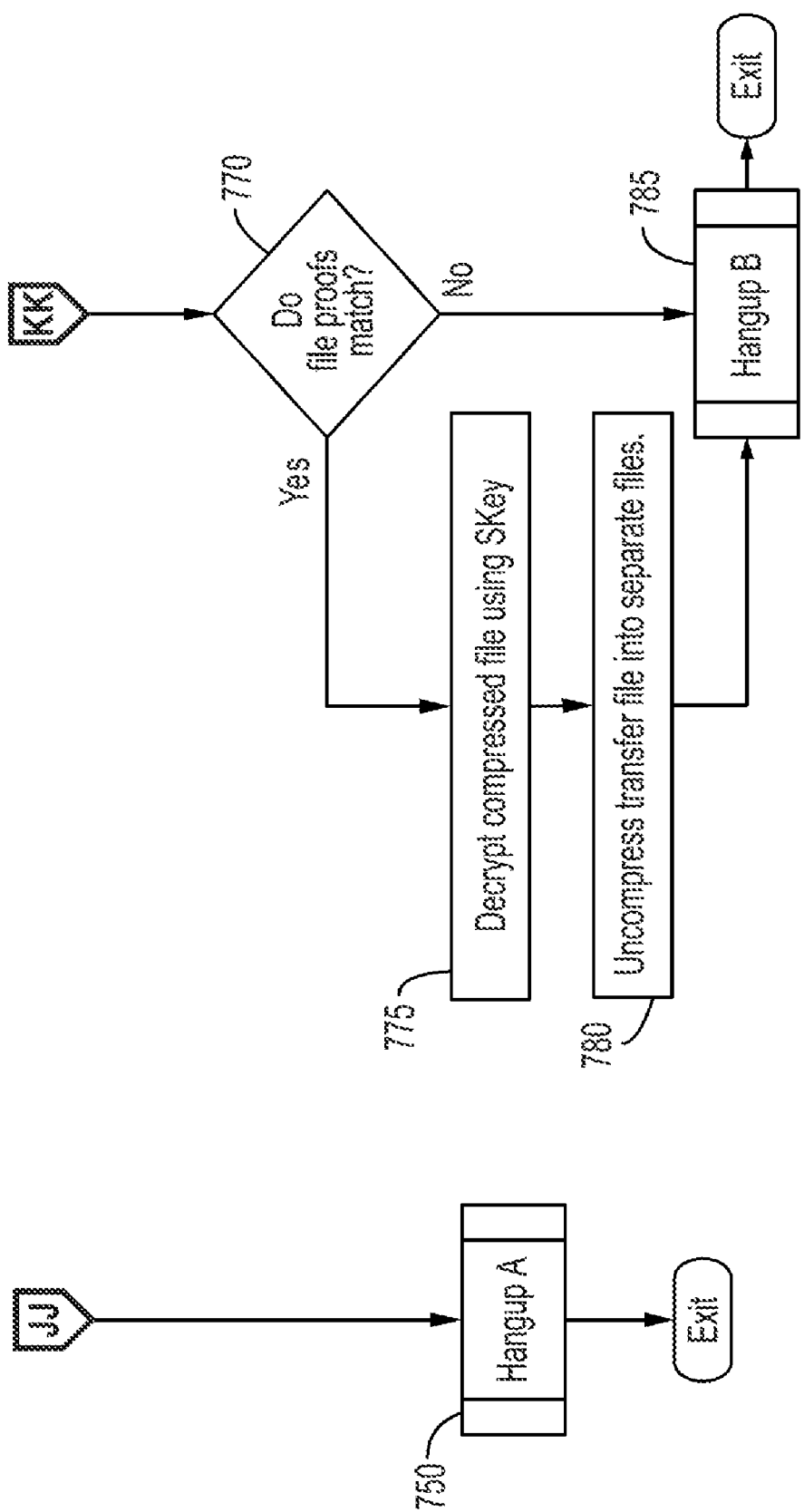

METHOD AND APPARATUS FOR SECURE COMMUNICATIONS

CROSS-REFERENCE TO RELATED APPLICATIONS

This application is a continuation of U.S. patent application Ser. No. 08/908,994 filed on Aug. 8, 1997, now U.S. Pat. No. 7,743,247, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

FIELD OF THE INVENTION

The invention relates to methods and apparatus for the secure communication of data, and more specifically to methods and apparatus for the delivery of encrypted data across publicly-accessible networks.

BACKGROUND OF THE INVENTION

Nearly every modern industry and profession requires the rapid delivery of a variety of types of communications. In many instances, an additional requirement is that the documents be maintained confidential during the delivery process. A still further complication is the ability of the recipient to verify the authenticity of the received document.

To respond to such requirements, the entire courier industry has been developed. Thus, a courier service arranges to pick up an original document from the sender and to deliver it, as promptly as possible within the charging structure, to a recipient. Because the document is maintained in a sealed envelope, confidential communications are frequently entrusted to such courier services. Since the documents can bear original signatures, their authenticity is generally presumed.

However, the operation of a courier service is labor intensive and the cost structure of the industry reflects its dependence on extensive manual effort. In addition, the responsiveness of the industry is generally dependent on the sender and recipient both being in either dose proximity or near a major airport. Thus, a recipient located in a remote portion of a foreign country may encounter significant delays in receiving a communication by courier simply because delivery requires extensive manual handling of the communication.

In addition, while a document delivered by courier is generally presumed to be maintained confidential, in fact it is apparent the confidentiality of the communication may be compromised with exceptional ease. As a result, some industries have taken to using specialized couriers which offer particular assurances of confidentiality.

Still further, the reliability of a courier service is equally limited, since it depends upon each link in a potentially extensive chain operating with substantial success. While such success occurs in the great majority of cases, there are numerous instances where increased reliability would be greatly desirable.

While modem telecommunications offers a response to some of the concerns about couriers, existing systems have generally proven inadequate to provide a suitable replacement for courier services. Thus, while a telephone call offers immediacy and access virtually to the farthest reaches of the globe, conventional telephone communications are not especially secure and do not provide communication of documents.

Fax machines, including fax machines with provision for confidential faxing, likewise suffer from numerous limitations, which include in most instances a lack of data encryption and substantial manual involvement in ensuring that the document is properly entered into the fax machine. Fax modems incorporated into personal computers offer some improvement on the document-loading scheme, but offer little or no encryption of the data, and typically do not verify destination. The result is little security for potentially quite valuable communications.

As a result, there has been a need for a secure communications technique which offers reliable high speed access to virtually anywhere a telephone or other network connection exists, while at the same time offering a high degree of confidentiality and security to the communications.

The security of data sent over telecommunications networks, including telephone networks, is important for many computer applications and systems. With a large network or a network that involves access via a public utility such as the telephone company, it is impractical to assure the physical security of the communications channel. Even with a single location, the size and configuration of most networks (e.g., wires, fiber optic cables, switching hardware, etc.) make it expensive or impossible to assure that communications are not being monitored.

An ideal data communications system would be easy to operate, inexpensive, reliable, widely available, fast, and secure. Existing networks, such as the public switched telephone network (PSTN), may be used to obtain some of these characteristics. In particular, the PSTN is relatively inexpensive, widely available, and reliable. The PSTN can be used to exchange digital data with reasonable speed (e.g., 28.8 kilobits per second using a modem implementing the V.34 protocol defined in International Telecommunications Union, "Recommendation V.34—A modem operating at data signaling rates of up to 28800 bit/s for use on the general switched telephone network and on leased point-to-point 2-wire telephone-type circuits," September 1994.) Higher speed modems, such as those operating at 33.6 or 56 kilobits per second, ISDN lines operating at up to 128 k-bits, or ADSL lines operating at even higher rates offer improved performance through the PSTN.

However, the PSTN is often not sufficiently secure for exchanging sensitive information. Specifically, communications may be monitored by tapping a telephone line or by recording a call at the telephone switch. Additional privacy protection is thus desirable.

Some kinds of protection may be added by users of the network to protect their own communications. For example, encryption may be used to ensure that eavesdroppers cannot determine the content of communications. Encryption algorithms, including the Data Encryption Standard (DES), are well known in the background art and may be used in scrambling and security systems to protect the privacy of data. (DES is defined in National Bureau of Standards, NBS FIPS PUB 46-1, "Data Encryption Standard," U.S. Department of Commerce, January 1988.)

End users can also use cryptography to protect their data exchanges against accidental or malicious modification.

(Such tampering can occur even if data is encrypted, since changes made to the ciphertext data stream will generally result in changes to the Plaintext data produced by the decryption process.) To protect against tampering, keyed MAC functions such as HMAC are often used. (HMAC is defined in M. Bellare, R. Canetti, and H. Krawczyk, "Keying Hash Functions for Message Authentication," *Advances in Cryptology—Crypto '96 Proceedings*, Springer-Verlag, 1996, pp. 1-15.) Alternatively, data may be digitally signed, for example using the RSA algorithm of U.S. Pat. No. 4,405,829 to Rivest et al. or using the Digital Signature Standard (National Institute of Standards and Technology, NIST FIPS PUB 186, "Digital Signature Standard," U.S. Department of Commerce, May 1994). Protocols and techniques usable by communicants to encrypt data and to protect data against tampering are well known in the background art. For example, the SSL protocol, used widely to protect transactions on the world wide web and in other applications, combines asymmetric (public-key) cryptography, symmetric (secret-key) cryptography, and MACs to securely select which cryptographic algorithms to use, authenticate communicants, negotiate shared keys, encrypt and decrypt data for privacy, and protect data against modification.

Encrypting modems (and other network interfaces) which use DES and other encryption algorithms to protect communications sent over the public switched telephone network (and other communications systems) are also known. Secure modems using encryption algorithms such as DES are commercially available, and modems running more sophisticated cryptographic protocols (such as SSL) are also known. Such modems can, if used properly, provide users with good cryptographic assurance of data privacy and integrity.

However, such encrypting modems cannot solve many applications' security and business requirements, and consequently they have failed to gain widespread acceptance in the marketplace. For example, existing encrypting modems used over the PSTN cannot protect the identities of communicating parties. In many cases it is as important to conceal from eavesdroppers the identities of the communicants as it is to protect the actual content of their communication. This problem cannot be solved by an end-user device since, for example, an eavesdropper can identify the recipient of a modem connection simply by observing the telephone number dialed by the party originating the call (e.g., by monitoring the DTMF tones generated by the transmitting telephone or modem). Other networking protocols suffer from the same limitation that eavesdroppers can determine at least identity of the intended recipient of data, even if the data is encrypted. Although Internet-based systems for protecting users' anonymity are known (e.g., remailers for PGP-encrypted e-mail and anonymizers for world wide web communications), the techniques they employ do not work with public switched telephone networks, and companies generally do not wish to send their private communications over the Internet.

A second problem with systems known in the background art is that the cost of the development and manufacture of the secure modem hardware and software must be recovered when users purchase the equipment. Since no after-purchase revenue is available to device manufacturers and vendors, customers are forced to make a substantial initial investment, often of several hundred dollars per user, to purchase the hardware and/or software. Many potential customers, such as companies with a large number of users who would all need to be equipped with the hardware, are deterred by this initial cost and ultimately end up using cheaper, less secure systems.

There has therefore been a long felt need for a data communications system which is easy to use, reliable, fast, secure and economical for transmitting confidential or sensitive information expeditiously even to remote points.

SUMMARY OF THE INVENTION

The present invention describes method and apparatus for delivering highly secure communications between authorized parties who may be remotely located with access available only over publicly accessible networks. Although the preferred embodiment of the invention protects standard modem communications exchanged via the PSTN, alternate embodiments may be used to protect other communications sent via ISDN or using other means. In general, the present invention may be thought of as an integrated network of dedicated hardware, communications software and telecommunications technology providing a secure private network for the delivery of electronic information.

The hardware layer of the present invention comprises at least a sender and recipient personal computer system, a device (typically a modem) at both the sender's and recipient's ends for accessing a telecommunications service, and a telephony server (typically a single device, but may be comprised of two or more servers, each of which could have one or more clients, networked to achieve greater efficiency and/or capacity), for managing connections between the respective computer/modem of the sender and recipient.

A variety of personal computers or workstations may be connected to the network of the present invention; in general, the invention is equally applicable on any available operating system and their associated platform, including Apple Macintosh™, IBM PC™, Sun™ or other Unix platforms, and so on.

Each personal computer system includes a modem device which, in at least some embodiments of the present invention, will be a secure modem device ("SMD".) In a presently preferred embodiment, the sender initiates a telephone call via the PSTN to a telephony server ("TS"). The TS serves as an intermediary between the sender and the receiver, thus protecting their identities from eavesdroppers, and additionally helps communicants negotiate key material and authenticate each other. In addition, the TS maintains appropriate record-keeping to track usage and thereby provide a source of revenue to manufacturers and vendors other than from the sale of security devices to end users.

In addition to the hardware layer, at the PC the present invention includes a software transport layer which may be thought of as including, at the top level, an operator interface, and behind the operator interface a communications module for managing communications with either a sender or recipient, key management, and enciphering and deciphering of messages. The Communications Module may reside in either the PC or the modem.

Documents selected for transmission are selected from a listing of available files; similarly, the destination is selected from a list of authorized destinations or, if not currently on the list, added as appropriate. The selection of files to be transmitted and their destination is particularly intended to be intuitive to the user, to permit successful operation of the system without the need for extensive training.

In operation, the call from the sender is routed to the TS in a conventional manner; that is, the sender initiates a call to the TS with the number encoded as a sequence of DTMF signals. The PSTN switch decodes the initial DTMF signals and routes the sender's call to the TS. After the TS answers the call, the TS and calling SMD follow a cryptographic protocol in which the caller authenticates the TS, the TS authenticates the caller, the TS receives an identifier of the call recipient's identity in encrypted form, and the caller receives encrypted key material from the TS. The TS can therefore be seen to verify the trust relationship between the sender and the recipient; the TS can therefore be seen to be a trusted service provider, or "TSP."

After receiving the cryptographically-protected representation of the call recipient's identity from the calling SMD, the TS attempts to establish a data connection with the specified destination party, first checking to determine whether or not the recipient is an authorized destination. If successful, the call recipient's SMD answers the call from the TS and performs a cryptographic handshake with the TS. In the handshake, the TS and the recipient's SMD cryptographically authenticate each other. In some embodiments the TS provides, in encrypted form, identification of the calling party. In addition, the same key material provided during the initial (TS/call initiator) handshake may also be sent, in cryptographically-protected form, to the call recipient.

When the handshakes are complete, the TS connects the incoming connection (from the call initiator's SMD) with the outgoing connection (to the call recipient's SMD), thereby allowing the SMDs to communicate directly with each other. At this point the TS may be effectively disconnected from the call. In a presently preferred embodiment, the SMDs establish a secure communications channel keyed using information derived either from the TSP-supplied keying material or negotiated directly between the SMDs; alternatively, information previously shared between the SMDs may also be used. No information which could be used by an attacker to identify the communicants needs to be exchanged in plain-text, or unencrypted, form. Once the SMDs have established, via the TSP, a secured communications channel, they exchange data, which may take the form of messages, files, images, programs, and so on, or may in some embodiments include video or audio information.

Because the recipient identification information is encrypted, it is protected from eavesdroppers. Cryptographic protocols and handshakes protect the system from other forms of attack. In addition, for added security, telephonic verification may be added as an authentication step to ensure that attackers cannot spoof the operation of the TS.

In addition to routing the telephone call, in a typical embodiment the switch collects information for auditing and billing purposes. For example, users may be billed on a per-call and/or per-minute basis for using the service. Such billing may be performed by any means, but in the preferred embodiment is accomplished by submitting charges to appear on the telephone bill of the call initiator, call recipient, or a third party.

Note that the TSP need not play any active role in the data exchange between the SMDs; it can simply serve as a portion of the communication network connecting the devices.

BRIEF DESCRIPTION OF THE DRAWINGS

FIGS. 7A-7D illustrate in flow diagram form the Data Exchange protocol by which a file transfer is made between sender and receiver.

FIG. 8A illustrates a first alternative of a send log screen in accordance with the present invention.

FIG. 8B illustrates a second alternative of a send log screen in accordance with the present invention.

FIG. 8C illustrates an embodiment of a receive log screen in accordance with the present invention.

DETAILED DESCRIPTION OF THE INVENTION

Figure 1:
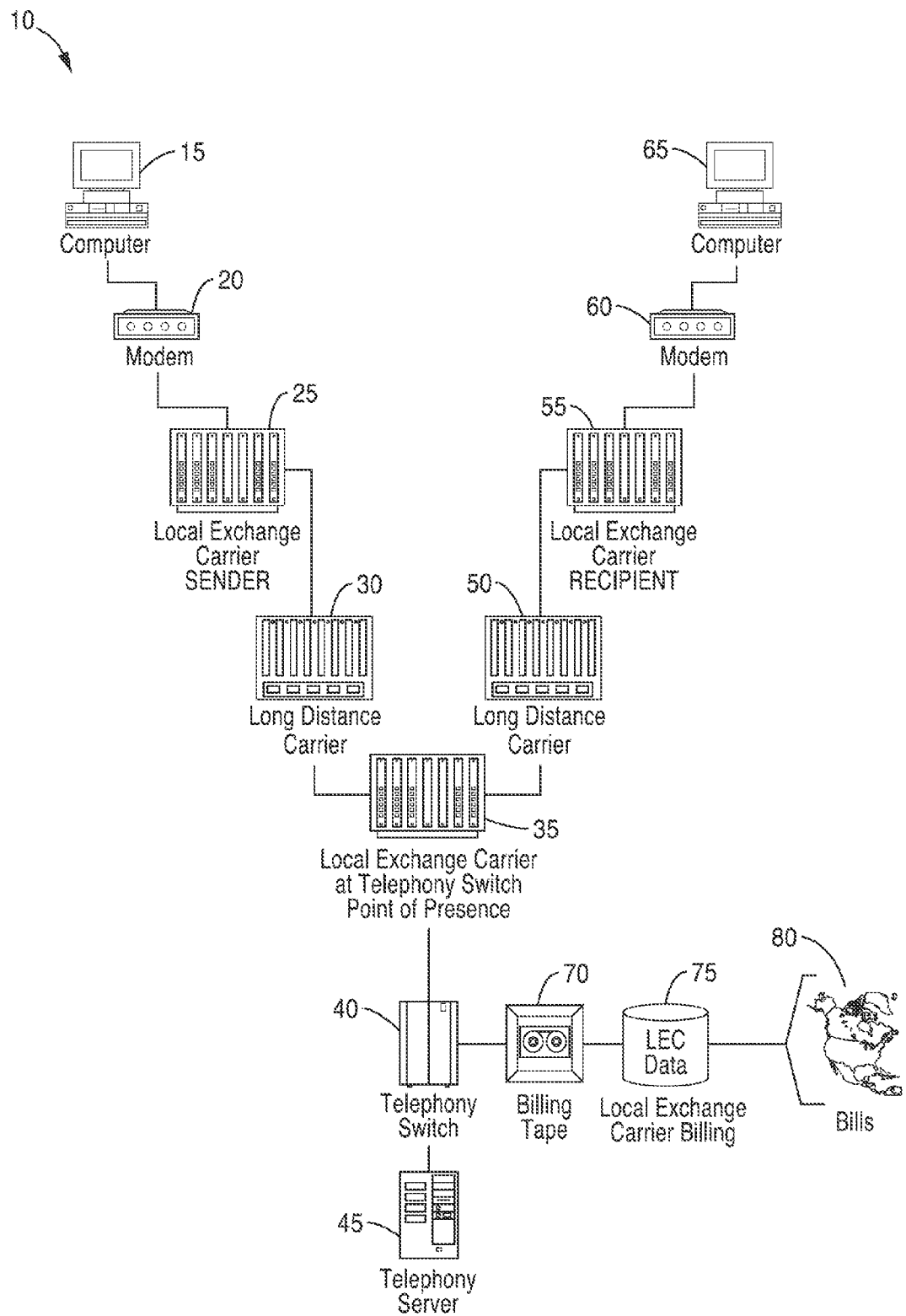
FIG. 1 illustrates in block diagram form a secure communications system according to the present invention.

Referring first to FIG. 1, the overall system of the present invention can be better appreciated. In simplest terms and without describing the software transport discussed at length below, a secure communications system indicated generally at 10 comprises a first personal computer or other workstation 15 operating in conjunction with a modem or other device 20 to access a local exchange carrier 25 of the PSTN or other communications link such as ISDN. A person seeking to make a secure exchange of data with a recipient selects the recipient on an appropriate menu, discussed hereinafter, which causes the workstation 15 to dial, through the modem 20, a single telephone number which connects the workstation 15 through the Sender's local exchange carrier 25. The local exchange carrier 25 then connects the call, either through the local carrier or a long distance carrier 30, to a local exchange carrier 35 at the point of presence of a telephony switch 40. In this manner, the call is connected to the telephony switch 40.

The telephony switch 40 cooperates with a telephony server 45 to which it is linked, and the telephony server both validates the identity of the recipient's account and authorizes a telephone connection to the recipient via the telephony switch 40. The telephony switch 40 then dials the recipient's modem number, again through the local exchange carrier 35 and also (possibly) through a receiver-side long distance carrier 50 as well as a Receivers local exchange carrier 55 located near the recipient. The Receiver's local exchange carrier 55 relays the call in a completely conventional manner to the recipient's modem 60 (or other similar device) and the recipient's associated workstation 65. After appropriate handshaking and authentication, discussed in greater detail hereinafter, the telephony server is effectively disconnected from the call and the data is transferred from the sender workstation 15 to the recipient workstation 65.

An additional but important feature of the system of the present invention is the capture of sufficient data to base billings on use of the system, similar to the manner in which conventional telephone calls are billed. To achieve this goal, a billing tape 70 captures the connection data for the authorized call initiated by the sender, and forwards it to an appropriate billing function. In a preferred embodiment, the captured data is provided to a billing system 75 of a conventional local exchange carrier who incorporates the billing into the conventional local phone bill. The bills 80 may then be sent to the user.

Figure 2:
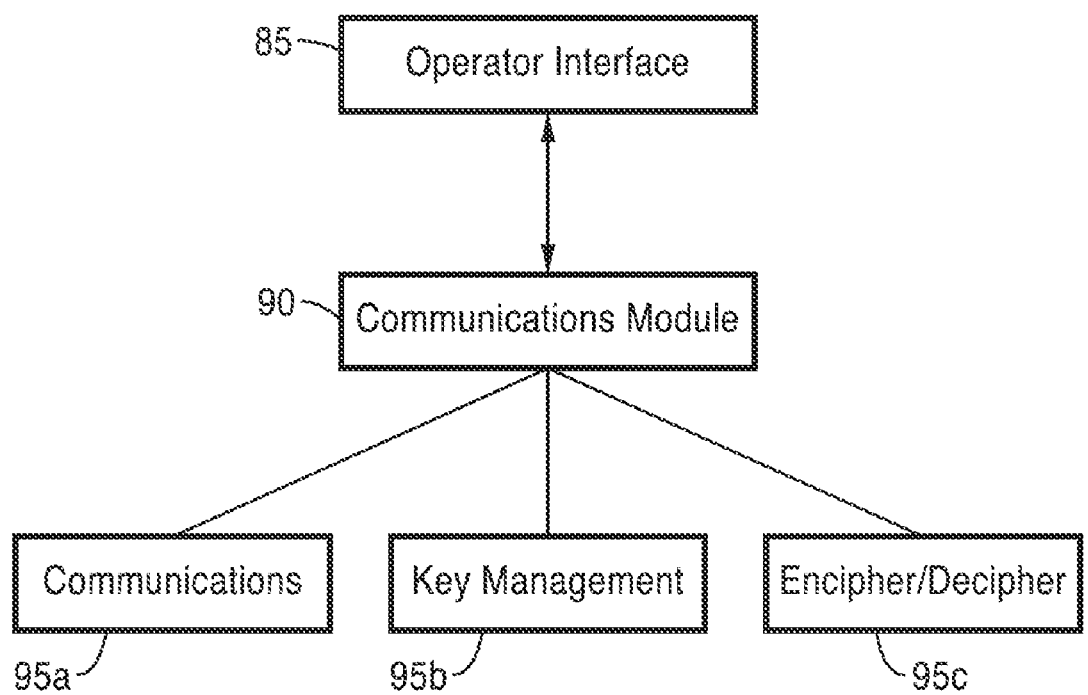
FIG. 2 illustrates a communications transport layer in accordance with the present invention.

Although the hardware comprising the system has been described generally, above, many of the critical functions of the system are performed in software. In particular, software functions are critical at the PC layer for both the sender and the receiver, and separately at the telephony server. At the PC level, including the modem, the software function comprises a communications transport layer, shown in FIG. 2. In particular, the communications transport layer comprises an operator interface 85 which communicates bidirectionally with a communications module 90 comprising three sub-modules 95A-95C to perform communications, key management and encipher/decipher functions. The communications sub-module provides a connection between a PC and a modem and the private network of the invention. The key management sub-module manages the enciphering/deciphering keys required for data transfers, while the enciphering/deciphering sub-module coordinates the encryption and decryption, as appropriate, of the data being transferred.

Figure 3A:
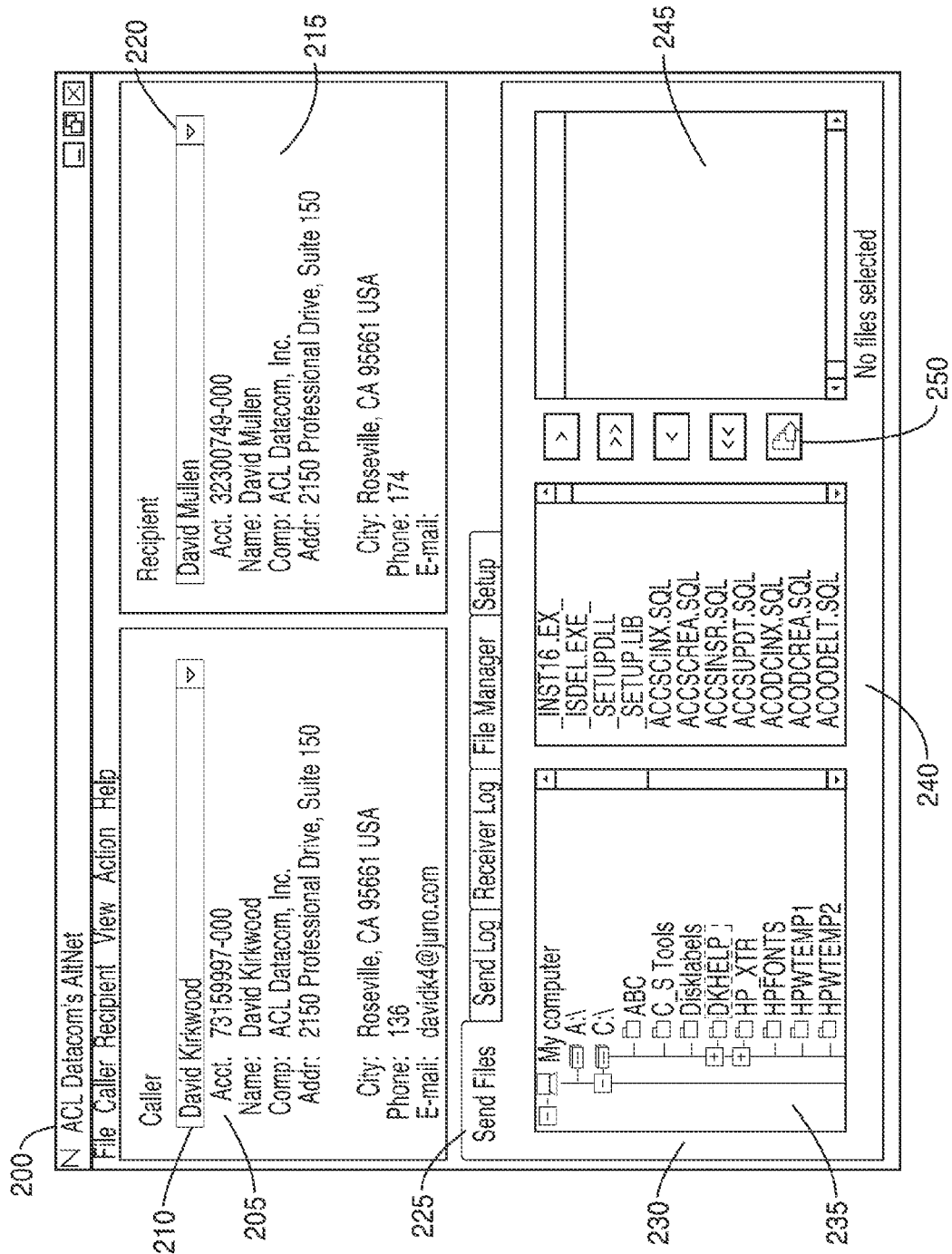
FIG. 3A illustrates a first alternative of a screen in accordance with the present invention for selection of files for transfer.
Figure 3B:
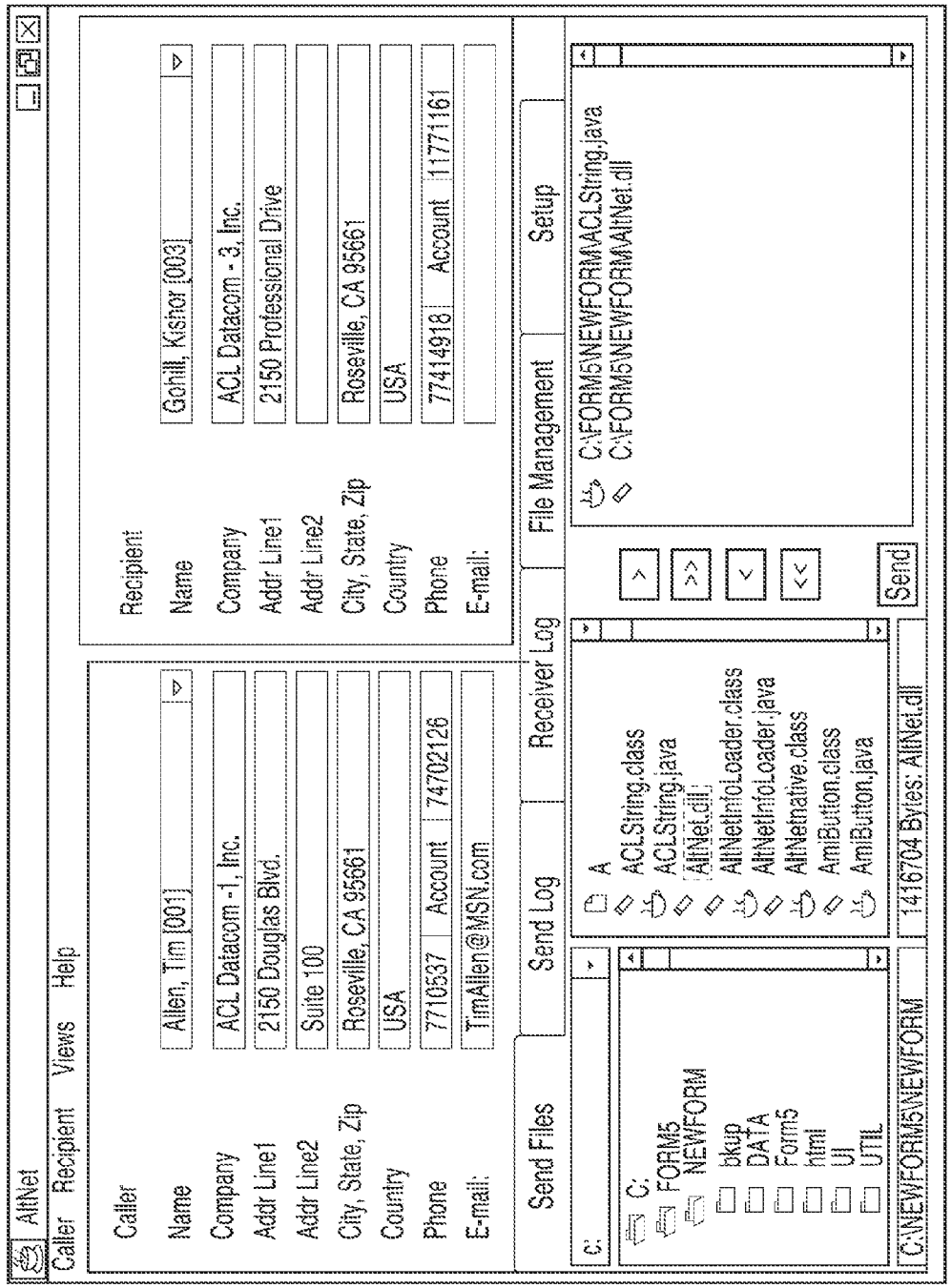
FIG. 3B illustrates a second alternative of a screen for selection of files for transfer in accordance with the present invention.

Referring next to FIGS. 3A-3B, which are alternative embodiments of a screen for selection of files to be transferred in accordance with the present invention, the operation of the system of the present invention may be appreciated in greater detail. FIG. 3A uses the Windows 95® version of the operator interface 85 by example, but alternately may comport to the look and feel of Java, UNIX, Macintosh® or other standards, as appropriate, and for example the Java screen may be as shown in FIG. 3B where like elements with FIG. 3A are shown with like reference numerals. To initiate a data transfer in accordance with the invention, a caller must have a valid account number stored in the system, typically at the telephony server. In addition, the recipient must have a valid account number stored in the same manner. The user seeking to initiate a data transfer opens the program, which brings up the window shown at 200 in FIG. 3. The window 200 may be seen to replicate closely the intuitive paradigm of an envelope: the left portion 205 of the window 200 includes a drop-down list of callers 210, which brings up, for example, the sender's account number and other appropriate identifying information. Similarly, the right portion 215 of the window 200 includes a drop-down list of recipients 220, with identifying information comparable to that shown in the left portion 205 and status information relative to authentication. Thus, the sender simply selects from the drop down lists the appropriate caller and recipient account information, in a manner intuitive to anyone who has ever addressed an envelope.

In addition to selecting a caller and a recipient, it is also necessary for the sender to select the data to be transferred. Although the data can take any form, including audio information, video information, or other data, for purposes of simplicity the information transferred in this example will be assumed to be conventional data or program files.

To select the files to be transferred, the user selects a "Send Files" tab 225 from a lower portion 230 of the window 200. The "Send Files" tab opens a drive window 235 which may, for example, list the directories in the selected drive. In an adjacent window 240 the files in a selected drive or directory(s) is displayed. The user selects files to be transferred from the files displayed in the window 240, which causes the selected files to be displayed in a selected files window 245. The user can select as many files as desired.

By clicking on the SEND icon 250, the files are aggregated, compressed and encrypted, forming a single session. At that point the call is automatically initiated. As previously noted, in a presently preferred configuration the modem is permitted to dial only the number of the telephony switch 40, although in some embodiments it may be desirable to use a conventional modem. This begins the process of actually exchanging data between the two systems.

Successful completion of a data transfer between two systems requires the completion of three protocols: the Call Manager protocol, the Key Exchange protocol, and the Data Exchange protocol. In general, the Call Manager protocol manages the process by which a caller (via a PC and modem) is identified to the telephony server 45, and identifies the recipient of the call—by account number in the exemplary embodiment described here. The PC 15 causes the modem 20 to generate DTMF codes to connect to the telephony server, identifying itself and the recipient. If both account numbers are valid, the caller and recipient are connected through the telephony switch to permit the respective PCs 15 and 65 to exchange data. At the same time, the telephony switch logs the call and captures the information necessary to track the call and handle time and billing.

Figure 4:
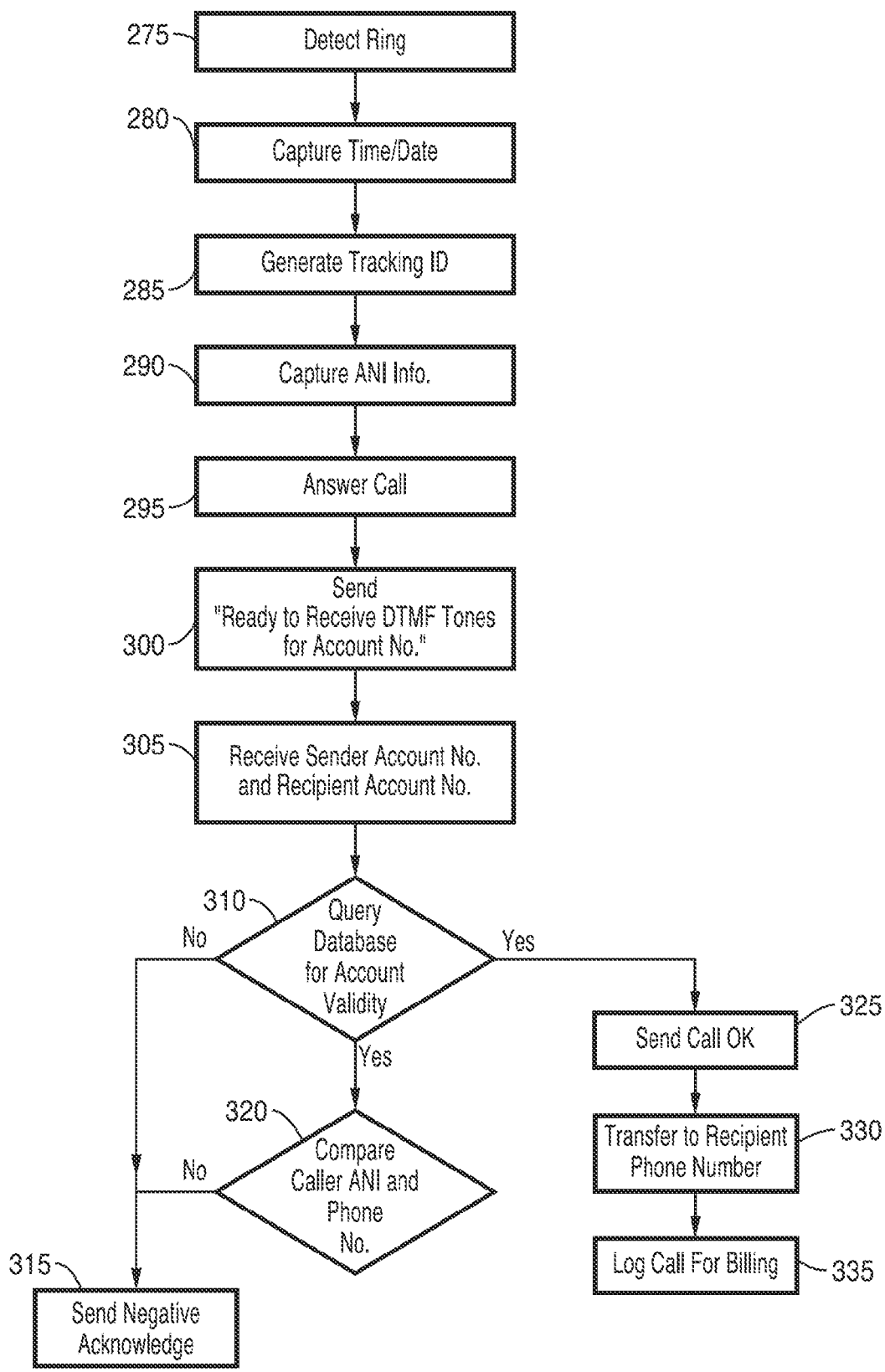
FIG. 4 illustrates in flow diagram form the Call Manager protocol of the present invention.

The Call Manager protocol may be better appreciated from FIG. 4. The protocol begins at step 275 with the telephony switch detecting a ring on one of its numerous ports. Once a ring has been detected, the time and date are captured at step 280 for billing and other purposes. The protocol advances to step 285 where a tracking ID is generated, and at step 290 ANI information about the sender is captured by the telephony server. At this point the sender's call is answered as step 295, followed at step 300 by sending a signal to the sender PC that the telephony server is now ready to receive from the sender the DTMF tones representative of the account number of the sender and the account number of the recipient. The sender PC then sends the appropriate account numbers at step 305.

At step 310, the account numbers are compared to a database of valid account numbers maintained in the system, typically in the telephony server. If one or both account numbers fails to match, a negative acknowledge is sent at step 315. However, if both numbers match valid account numbers in the database, the process advances to step 320. At step 320, the caller's ANI data and phone number are compared to the system database, to further confirm the validity of the sender. In particular, this compares the caller's telephone number, modem number, and other selected information. If any of this additional information does not match that in the database, the process branches to a negative acknowledge at step 315. However, if all of the requisite data matches, the processes advances to step 325 where the telephony server sends a "call OK" message. The call is then transferred to the recipient phone number at step 330, and the call is logged for billing purposes at step 335.

Once the call has transferred to the recipient, the sender and recipient must exchange keys through a handshaking process. This is managed by the Key Exchange protocol, described in FIGS. 5A-5C. Those skilled in the art will recognize that the steps in FIGS. 5A-5C have been simplified somewhat for clarity, including the elimination of time outs and other internal testing for data integrity. Data flow between the sender and recipient is shown by a dashed line.

Figure 5A:
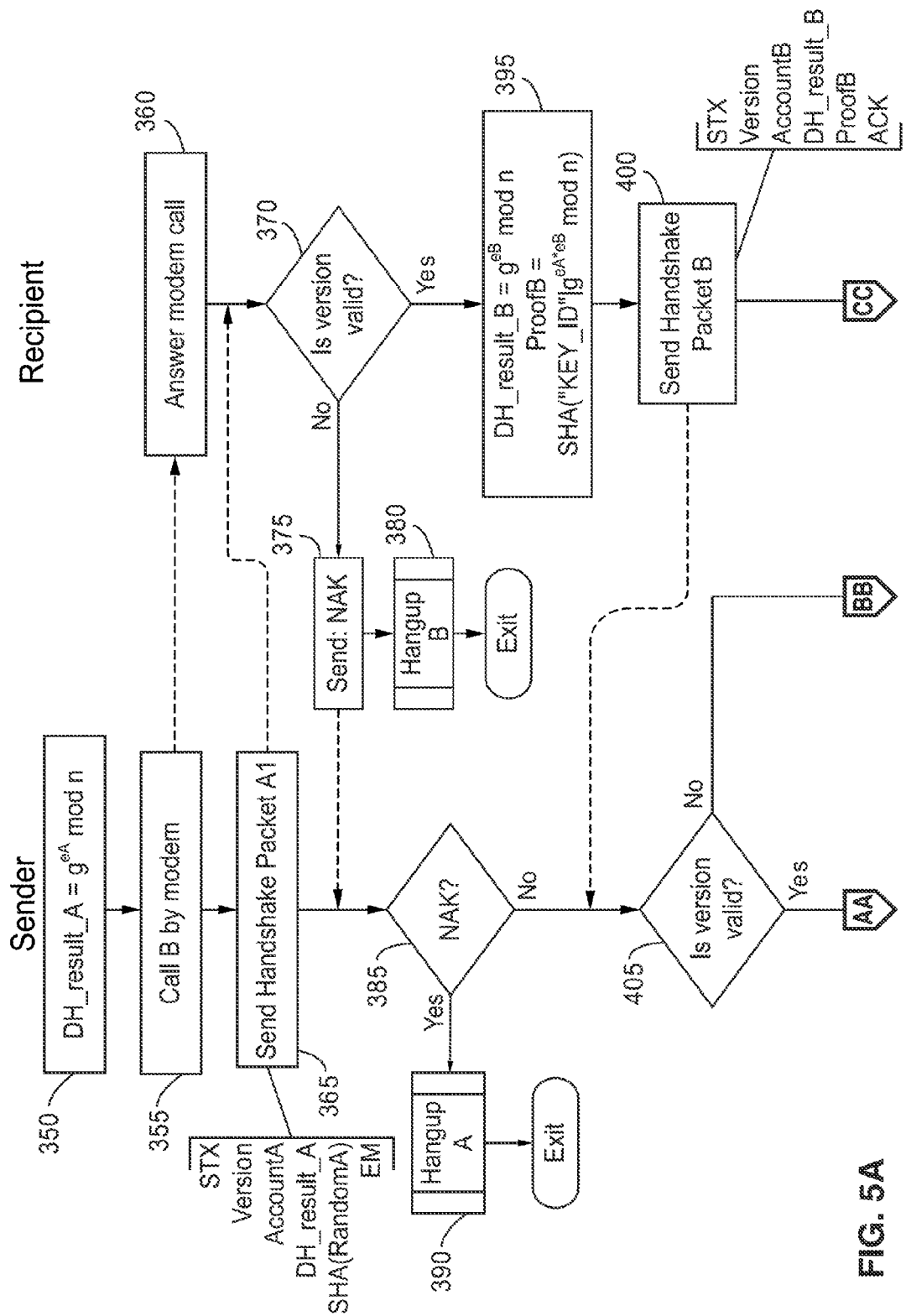
FIGS. 5A-5C illustrate in flow diagram form the Key Exchange protocol by which keys are exchanged between sender and receiver.
Figure 5B:
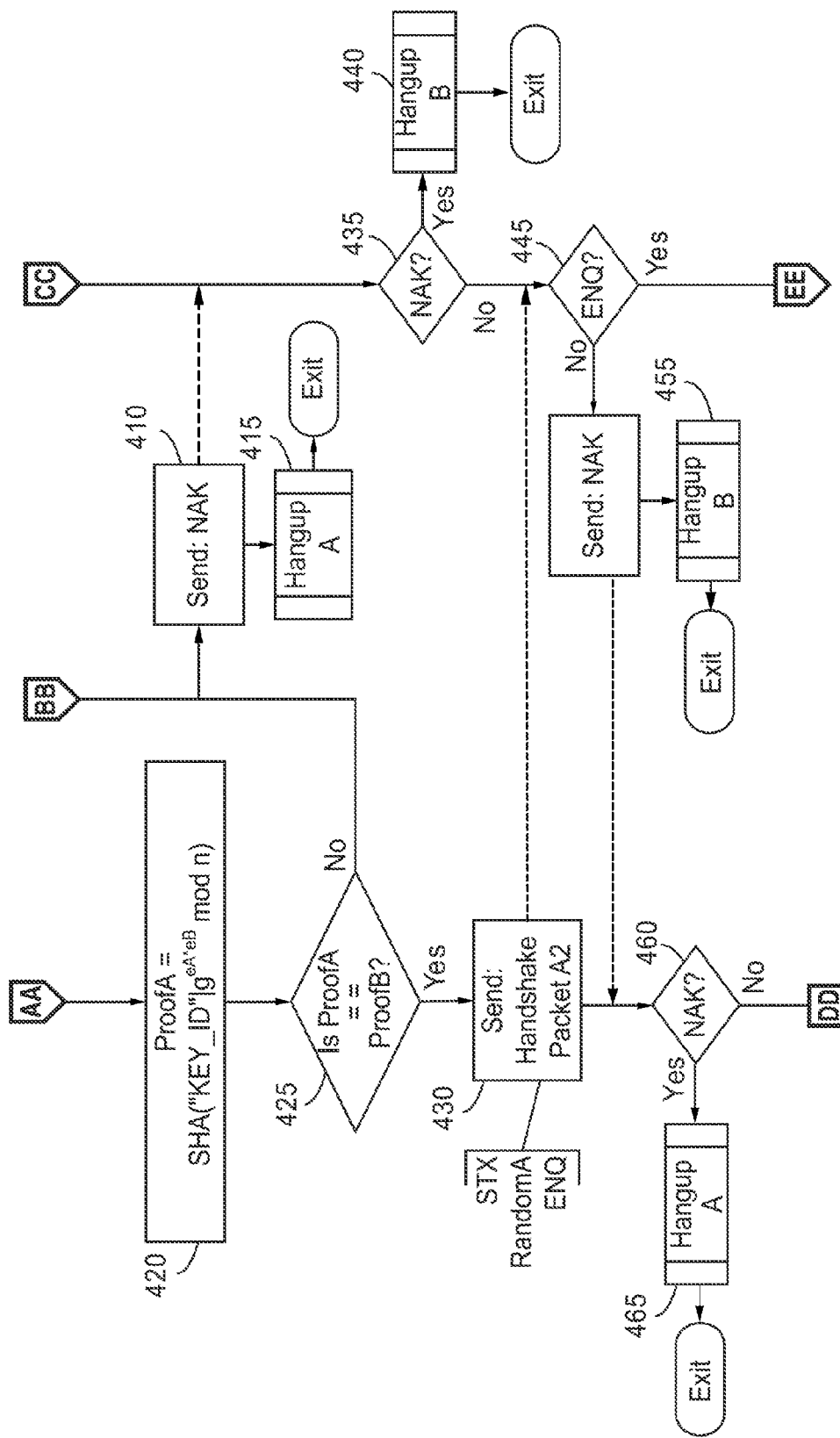
Figure 5C:
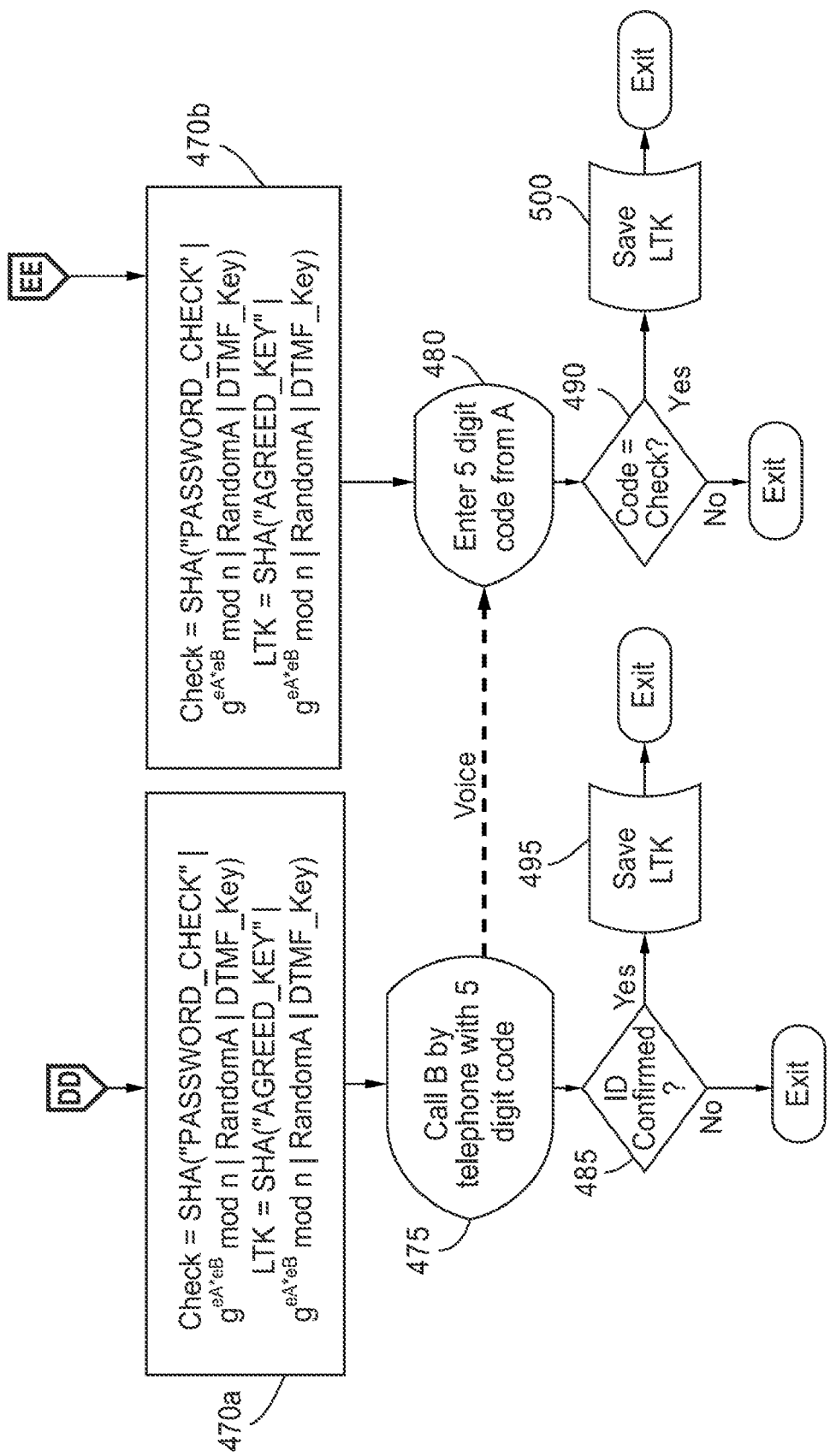

The protocol of FIGS. 5A-5C begins at step 350 with the sender generating an appropriately secure key, for example a Diffie-Hellman random exponent eA and computing the related value $g^{eA}$ mod n, where g and n are fixed system-wide parameters. The sender also generates a 20-byte pseudorandom value, RandomA. Then, at step 355, the sender modem contacts the recipient modem. The recipient modem answers the modem call at step 360, which causes the sender to initiate a handshake session at step 365 by sending a first handshake packet, Handshake Packet A1. The first handshake packet sent by the sender includes the sender's version information, account number, $g^{eA}$ mod n, and a hash of RandomA. The data structure may be, for example:

| Field | Comments | Size (bytes) |
|---|---|---|
| STX | Framing | 1 |
| Low Version | Lowest version supported | 1 |
| Hi Version | Highest version supported | 1 |
| AccountA | Sender's account number | 12 |
| DH_result_A | $g^{eA}$ mod n | 128 |
| Hash_RandomA | SHA(RandomA) | 20 |
| EM | Framing | 1 |

Once the handshake session has started, the key exchange must be completed before data can be transferred. If, as tested at step 370, the recipient cannot support the version transmitted by the sender, a negative acknowledge results and the system branches to step 375 to transmit the message to the sender as well as causing a hangup and exit at the recipient end at step 380. In each case, the message associated with the hangup contains housekeeping information which is entered into the Send Log and the Receive Log. The sender then tests the negative acknowledge (NAK) signal at step 385, and if so, executes a hang up and exit at step 390.

In most instances, however, the version will check as valid at step 370. In this circumstance, the recipient develops its responsive handshake packet, Handshake Packet B, at step 395 in a data structure similar of the sort shown below:

| Field | Comments | Size (bytes) |
|---|---|---|
| STX | Framing | 1 |
| Version | version being spoken | 1 |
| AccountB | Recipient's account number | 12 |
| DH_result_B | $g^{eA}$ mod n | 128 |
| ProofB | SHA("KEY_ID"$\|g^{eB}$ mod n) | 20 |
| EM | Framing | 1 |

The KEY_ID string represents, in an exemplary embodiment, a six-byte string, typically with no terminating byte.

The recipient handshake packet is then transmitted to the sender at step 400. The version specified by the recipient handshake packet is checked at step 405, and if not supported by a negative acknowledge and hangup are generated at steps 410 and 415, respectively. In most cases the version will be supported such that the check at step 405 will be affirmative, and the process will advance with the sender performing a proof step at step 420. At step 425, the result of the proof step is then compared to the ProofB portion of the recipient handshake packet, Handshake Packet B. A negative result forwards to step 410 for hangup and exit, while a successful check causes the sender to generate a second handshake packet, Handshake Packet A2, at step 430 and transmit it to the recipient. If a negative acknowledge is sent at step 410, it is detected at step 435 and a hangup and exit executes at step 440.

Then, at step 445, a comparison is then done at the recipient end to compare the RandomA value received in the second handshake packet with the RandomA value received in the first handshake packet. A negative compare results in the generation of a negative acknowledgment at step 435 and a hangup and exit at step 455, while a positive compare continues the process. On the sender's side, a negative acknowledgment detected at step 460 results in a hangup and exit at step 465. The process continues with both the sender and the recipient computing, at steps 470A and 470B, respectively, a check of the password. The result is the generation of an ordered string of words which are then reduced to form a five character string X, together with the generation of a long term key at both the sender and recipient sides.

Figure 6A:
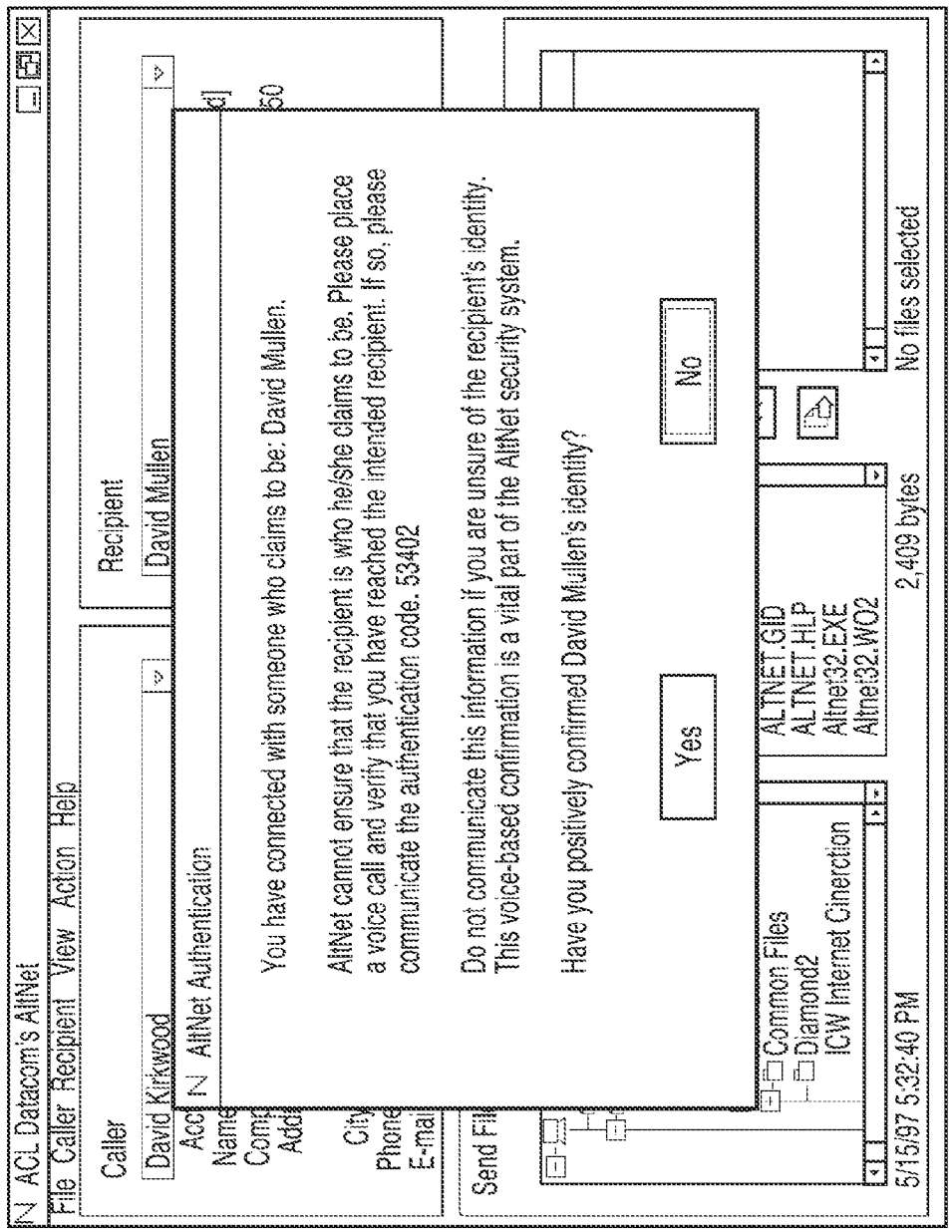
FIG. 6A illustrates a first authentication screen for one stage of a file transfer.
Figure 6B:
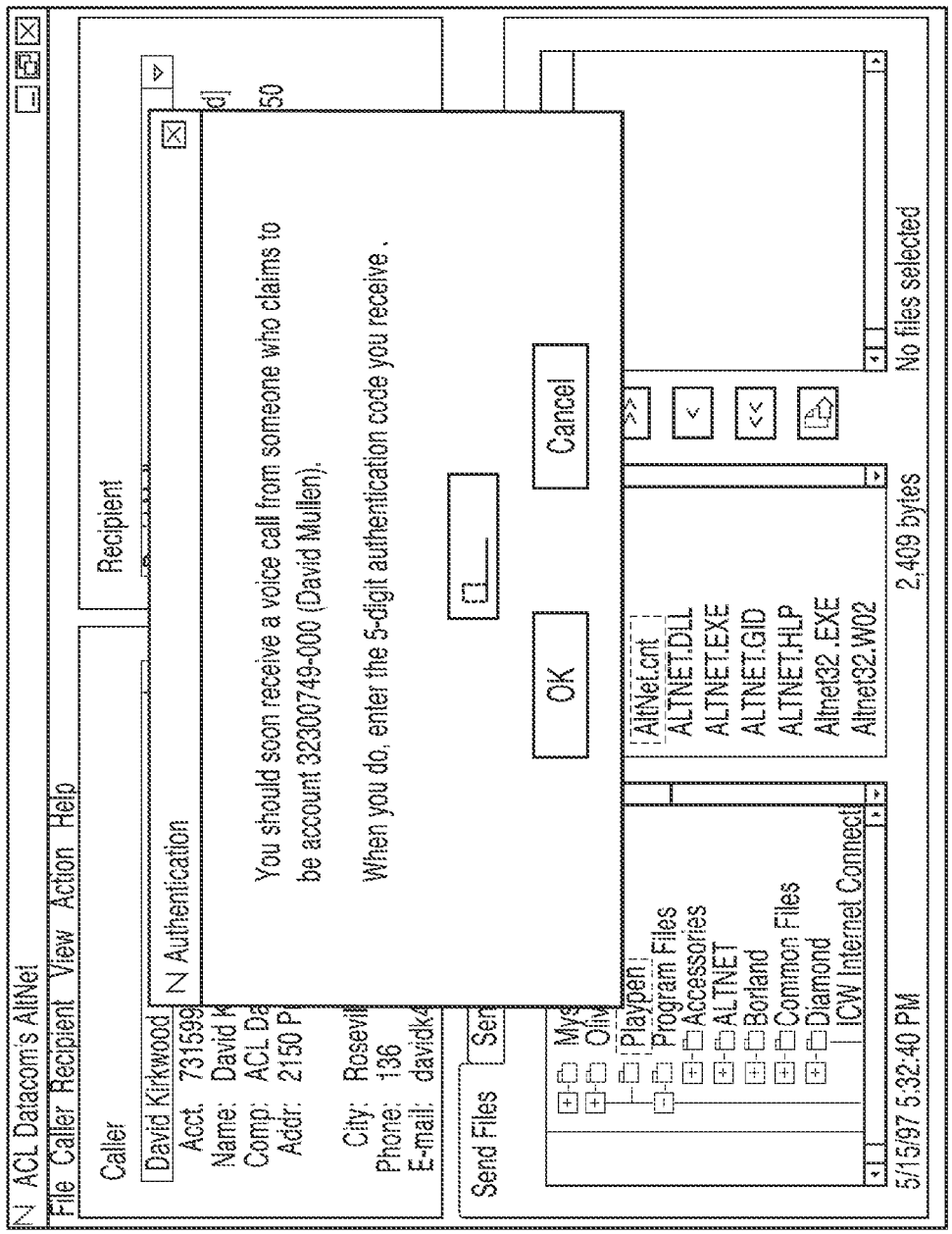
FIG. 6B illustrates a second authentication screen for a second stage of a file transfer.
Figure 7A:
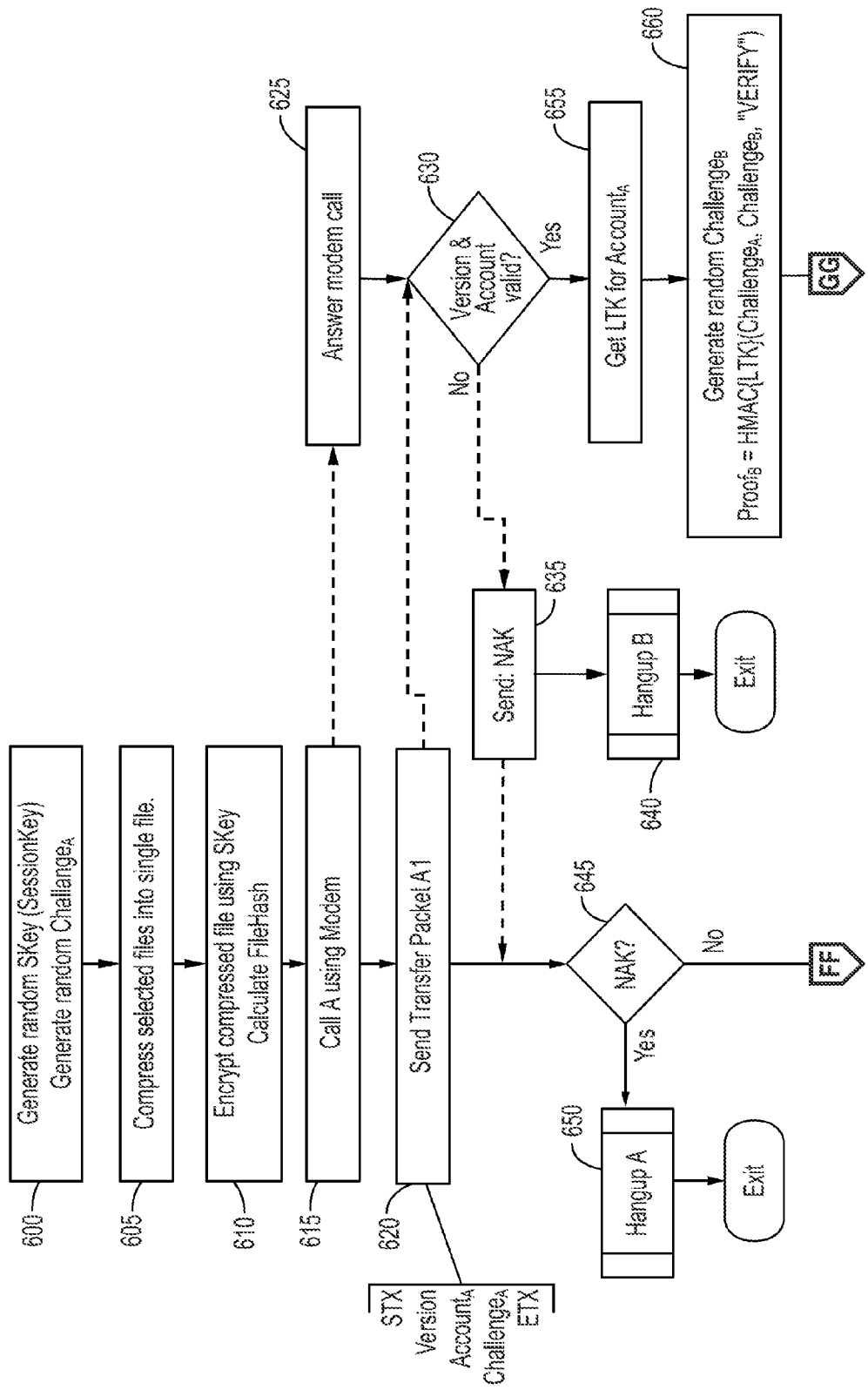
Figure 7B:
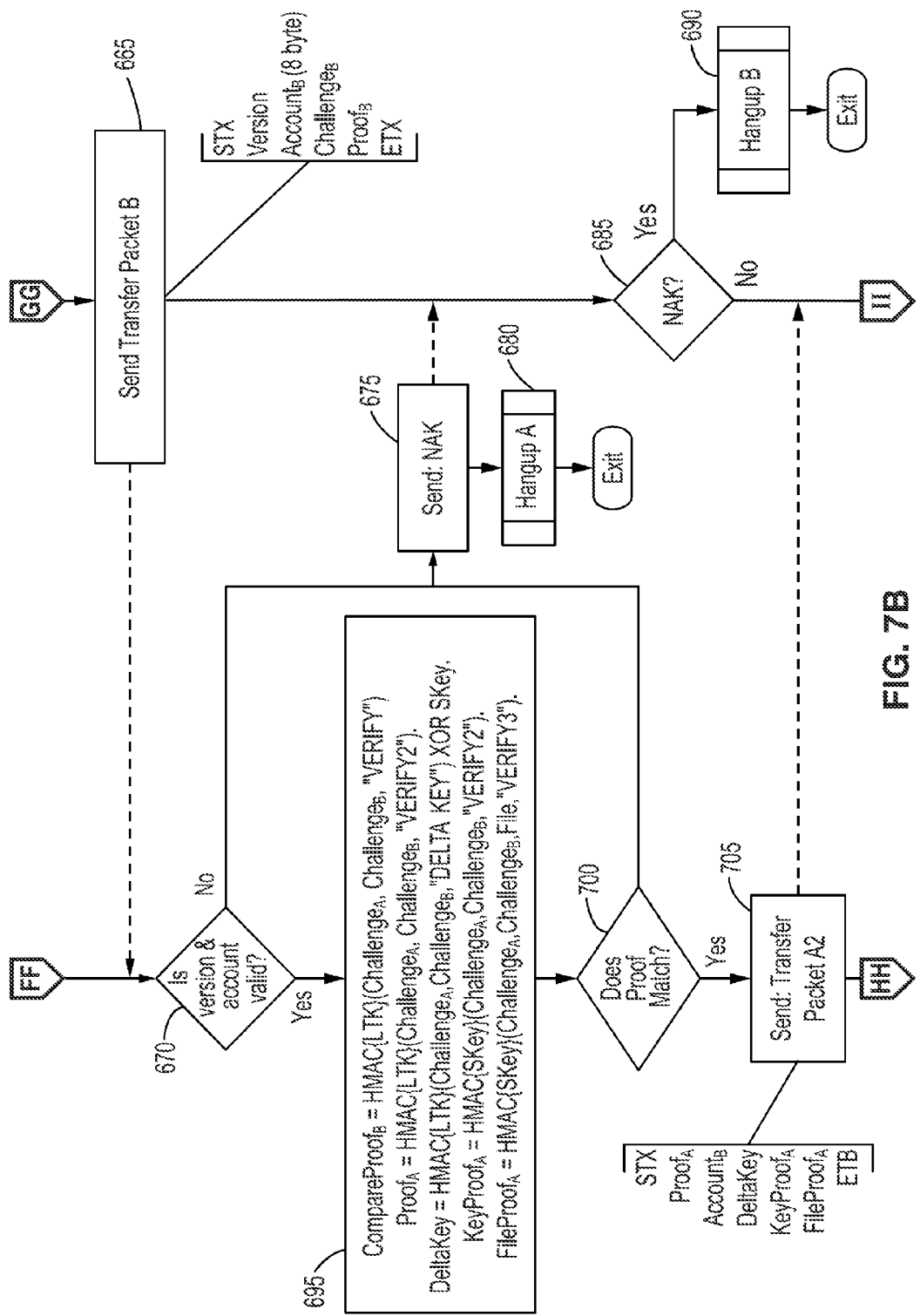

The string X is then displayed as a pop-up window at the sender side, as shown in FIG. 6A, and the sender is instructed to telephone the recipient to provide the string X. On the recipient side, shown in FIG. 6B, the recipient is instructed to await a call from the sender and to insert the string X. These steps are shown in FIGS. 5A-5C as steps 475 and 480, respectively. If the ID is confirmed, as checked at step 485 on the sender side and step 490 on the recipient side, the long term key LTK is saved at steps 495 and 500, respectively, followed by an exit. If the check at steps 485 and 490 results in a negative compare, the long term key is not saved and the process simply exits.

At this point, if the protocol has executed successfully, both the sender and receiver have saved the Long Term Key and have established in their respective account listings that the sender/recipient pair is authorized to transfer data. This concludes the Key Exchange protocol.

Once the Key Exchange protocol of FIGS. 5A-5C is completed, the system moves on to the Data Exchange protocol shown in FIGS. 7A-7D. As with FIGS. 5A-5C, the flow diagram of FIGS. 7A-7D is idealized and simplified, and data flow between the sender and recipient processes is shown with a dashed line.

The process begins at step 600 with the sender generating a random Session Key, or SKey, which may, for example, be on the order of 20 bytes, followed by generating a random challenge which may also be on the order of 20 bytes. The process then moves on to step 605 with the compression of the files to be transferred, selected as shown in connection with FIG. 3. At step 610, a FileHash is calculated in accordance with HMAC{SKey}("File_Check"|file) and appended to the compressed file, after which the compressed file with the appended hash is encrypted. In an exemplary embodiment, the encryption is performed using triple DES in encrypt-decrypt-encrypt mode. Block chaining using CBC mode is then performed, external to the DES operations. The first, second and third 56-bit DES keys are taken as the left-hand 64 bits of HMAC{SKey}("KEY1", MAC{SKey}("KEY22") and HMAC{SKey}("KEY333"), respectively. Each 64-bit DES key typically contains fifty-six effective key bits, with the rest ignored as parity. The HMAC and encryption are typically performed as a single pass, and date and time of the file are preferably preserved.

Once the encryption is complete, the sender establishes a data connection with the recipient, as shown in FIGS. 7A-7D at step 615. The sender then transmits to the recipient, at step 620, Transfer Packet A1 having a data structure as follows:

| Field | Comments | Size (bytes) |
|---|---|---|
| STX | Framing | 1 |
| Low Version | Lowest version supported | 1 |
| Hi Version | Highest version supported | 1 |
| Account$_A$ | Sender's account number | 12 |
| Challenge$_A$ | Random Challenge from Sender | 20 |
| ETX | Framing | 1 |

At step 625, the recipient answers the call from the sender and then, at step 630, checks the sender's account number in its authorization file. If the account number is not found, a negative acknowledge is transmitted at step 635 back to the sender and a hangup and exit is executed at the recipient side at step 640. On the sender side, a check for a NAK is made at step 645, and if a negative acknowledge was generated at step 635 the process executes a hangup and exit at step 650.

However, if the version and account number checked as valid at step 630, the recipient gets the LTK for the account at step 655. At step 660, the recipient generates its own random Challenge$_B$ and, in addition, calculates ProofB=HMAC{LTK}(ChallengeA|ChallengeB|"Verify"). The recipient then sends its own transfer packet, Transfer Packet B, to the sender at step 665. This transfer packet has the following data structure in an exemplary embodiment:

| Field | Comments | Size (bytes) |
| --- | --- | --- |
| STX | Framing | 1 |
| Version | Version being spoken | 1 |
| Account$_B$ | Recipient's account number | 12 |
| Challenge$_B$ | Random Challenge from Recipient | 20 |
| Proof$_B$ | Proof of B's Identity | 20 |
| ETX | Framing | 1 |

The sender receives the transfer packet from the recipient and, at step 670, checks to verify version and account number. If not, a negative acknowledge is sent to the recipient at step 675 and a hangup and exit are executed on the sender side at step 680. If a negative acknowledge is transmitted at step 675, it is detected on the recipient side at step 685, which likewise causes a hangup and exit at step 690.

However, if the versions and account numbers are verified, the sender side moves on to step 695 and the sender computes CompareProof$_B$ which it compares with Proof$_B$ from the recipient side. If the proofs do not match, as determined at step 700, the process aborts by jumping back to step 675. However, as will most often be the case, the proofs will match and the process will advance to step 705.

At step 705, the sender side transmits to the recipient a second transfer packet, Transfer Packet A2, having, in at least an exemplary embodiment, the following data structure:

| Field | Comments | Size (bytes) |
| --- | --- | --- |
| STX | Framing | 1 |
| Account$_B$ | Recipient's account number | 12 |
| Proof$_A$ | Proof of A's Identity | 20 |
| DeltaKey$_A$ | Delta of session key from A | 20 |
| KeyProof$_A$ | Proof of session key from A | 20 |
| FileProof$_A$ | Proof of encrypted file from A | 20 |
| ETB | Framing | 1 |

In response, the recipient calculates, at step 710, a CompareProof$_A$ value based on HMAC{LTK}(Challenge$_A$|Challenge$_B$|"Verify2"). The recipient also calculates a session key SKey and, as well, a proof of the session key, or KeyProof$_B$. Then, at step 715, CompareProof$_A$ is compared to Proof$_A$ and KeyProof$_A$ is compared with KeyProof$_B$.

If either proof fails, a compare at step 715 fails and a negative acknowledge is sent to the sender at step 720. On the recipient side, a NAK causes a hangup and exit at step 725. On the sender side, the NAK is checked for at step 730, and if found, causes the sender to hangup and exit at step 735.

However, if the proofs match, the process advances on the recipient side by sending an Acknowledge to the sender at step 740. The sender side then advances to step 745 where the sender transmits the compressed and encrypted file to the recipient, after which the sender side of the process completes by hangup and exit at step 750. The recipient side receives the compressed and encrypted file at step 760, and the computes a FileHash and also calculates at step 765 a FileProof$_B$ based on HMAC{SKey}(Challenge$_A$|Challenge$_B$|FileHash|"Verify3"). FileProof$_B$ is then compared to FileProof$_A$ at step 770 and, if the proofs match, the file is decrypted at step 775 using the SKey and then uncompressed at step 780 into individual files. If the proofs do not match after decompression, a hangup and exit is executed at step 785.

Figure 8A:
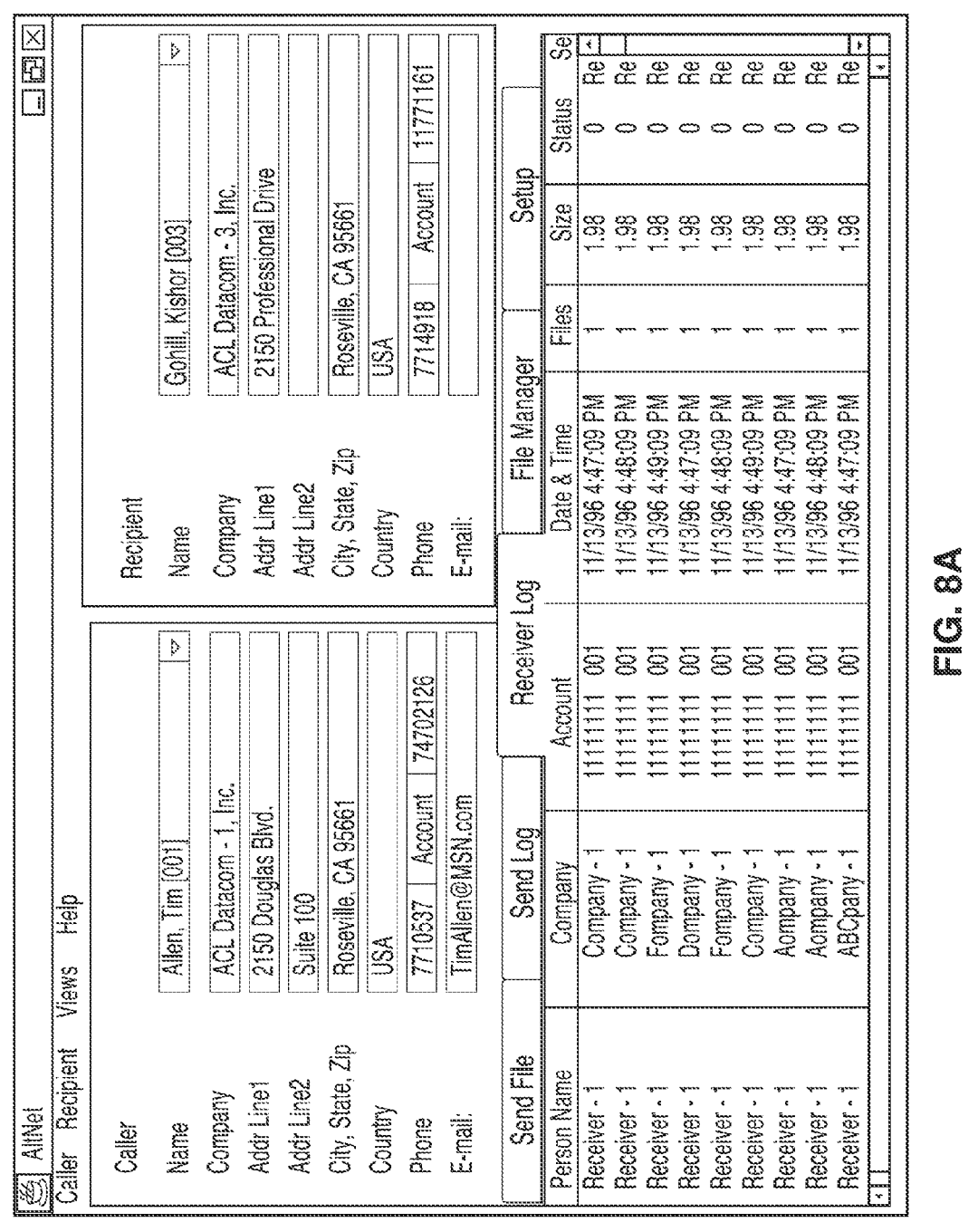
Figure 8B:
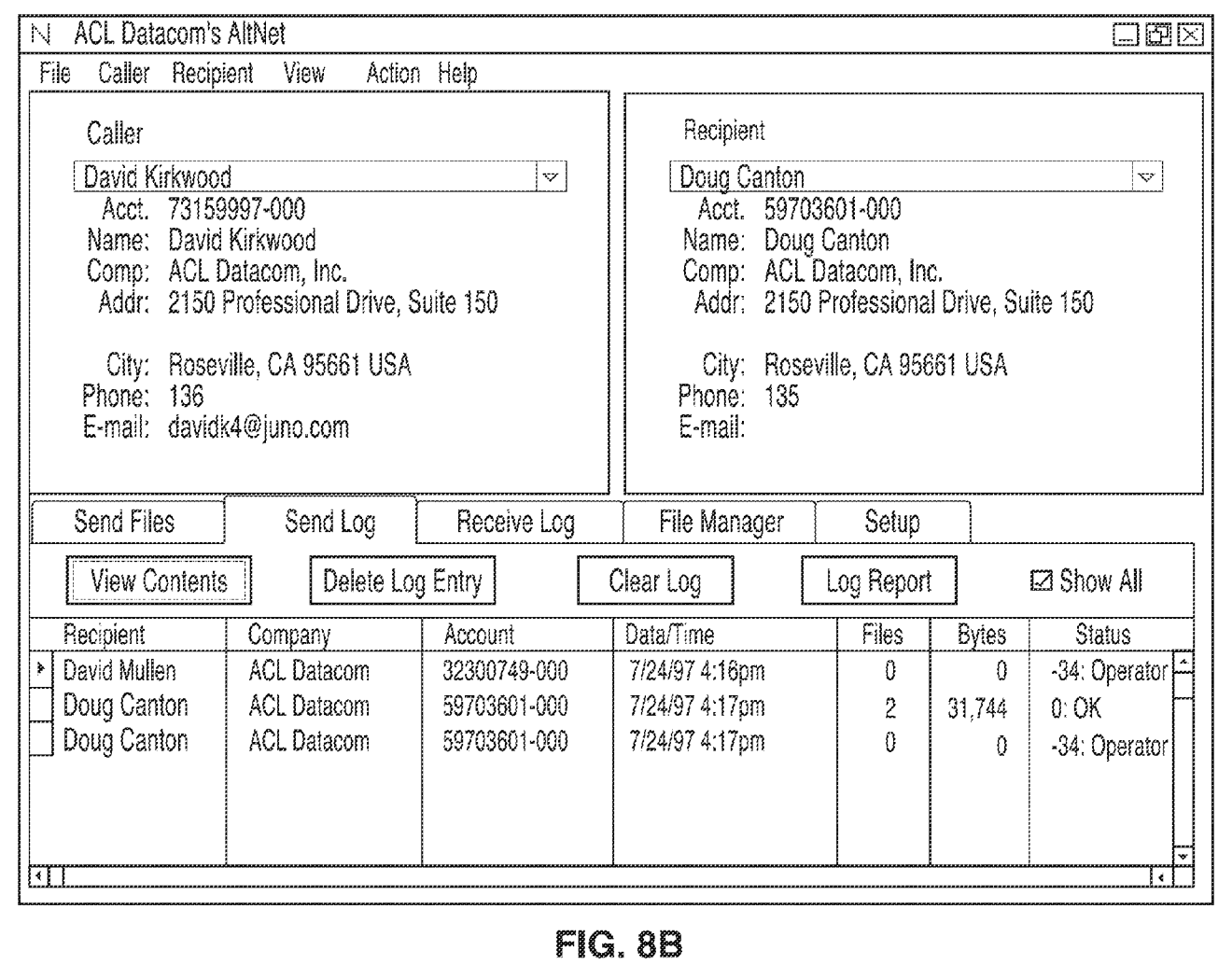
Figure 8C:
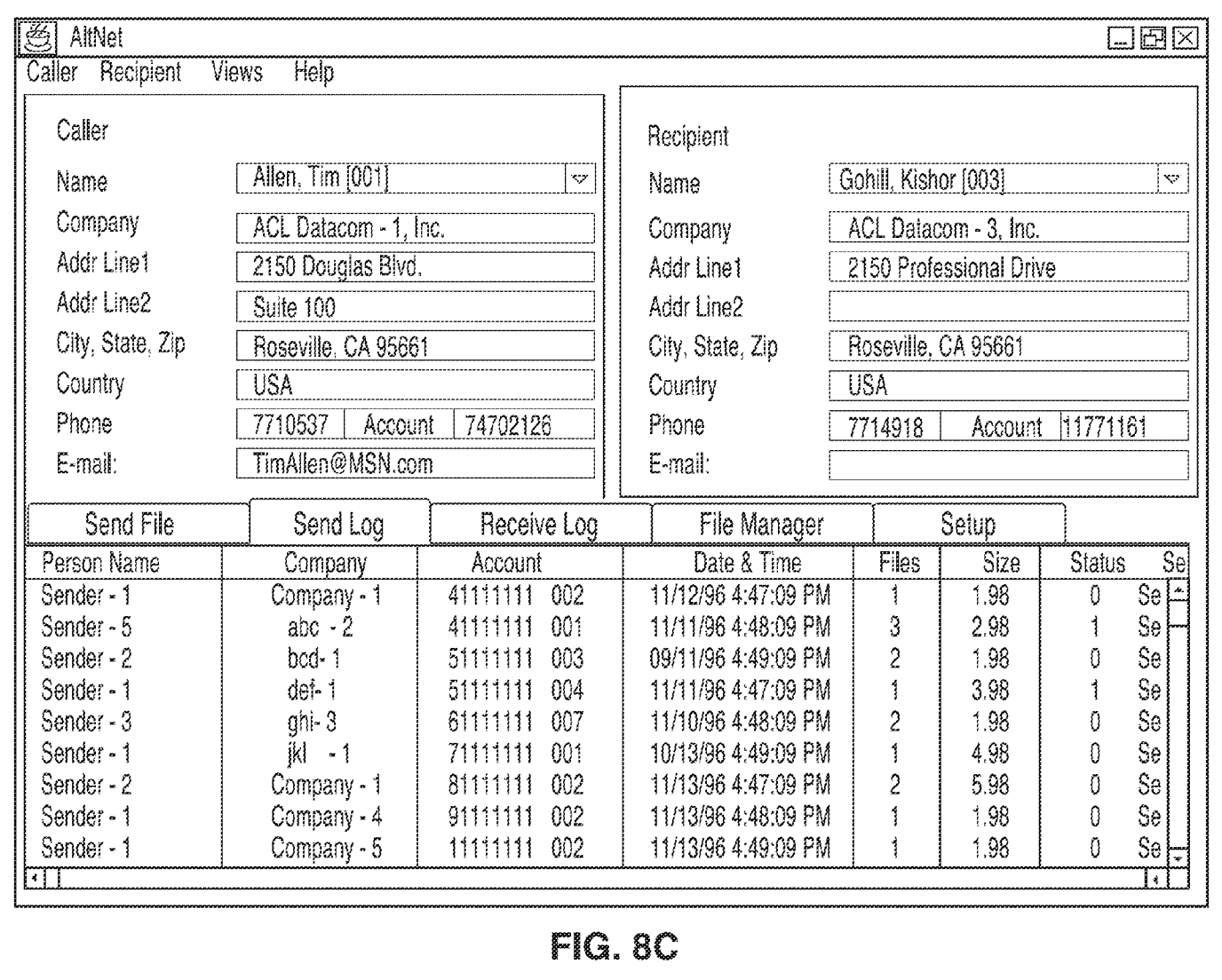

Referring next to FIGS. 8A-8C, the manner in which the transfer of files is recorded by the sender and recipient can be better appreciated. Assuming the files were successfully decompressed at the receiver side, the session is then displayed in the recipient's inbox, as shown in FIG. 8A, the number of files within a session being noted in the column entitled "Files". Those file names can, in turn, be viewed individually in a related screen overlay. As seen in FIGS. 8B-8C, which show the general arrangement of a send log but is very similar to the receive log of FIG. 8A, the transferred files are listed by the recipient or sender, depending on which fog is examined, the company, account, the date/time, and other related information. It will be appreciated that in each of FIG. 8A-8C, the upper portion 800 of the screen maintains the "envelope" paradigm discussed previously, while the lower portion 805 of the screen maintains a file arrangement which identifies the directories in a left window 810 and files within the directories in a second window 815 to the right of the directories window.

At this point the transaction is completed and the telephony server completes the log of the call duration and related data for purposes of generating billing. As previously noted, the billing is processed, in a presently preferred embodiment, through a local telephone service provider.

Although a presently preferred embodiment has been described in detail in the foregoing, numerous alternatives exist which do not depart from the invention. One particularly attractive alternative is to cache communications at the telephony server 45 (FIG. 1), and forward them later to the destination system 65. This additional delay can be used to complicate attempts by attackers to use traffic analysis at the TSP to identify communicants. (For example, an attacker might try to correlate incoming calls to the TSP with outgoing calls from the TSP.) Caching can also be used to reduce communication costs (e.g., by delaying connections until nighttime to take advantage of reduced telephone rates). This approach has the negative of a lack of immediacy and thus will have some restrictions on its application.

Also, and as previously noted, the software portion of the present system may be implemented to eliminate any code resident on the modems, thus placing all user code at the PC level and permitting the use of general purpose modems. Additionally, although the presently preferred embodiment is implemented using standard communications protocols such as v.34, other encoding methods are also acceptable in many embodiments. Likewise, dual-mode approaches may be desirable in at least some embodiments, in which slower DTMF codes are used for some functions while faster v.34 protocols are used for file transfer.

In addition, various elements of the cryptographic engine or related databases may be implemented on a removable cryptographic token, such as a smart card. The smart card may connect directly to the TSP, or may be accessed via a smart card reader or other device connected to the TSP. Likewise, particular sequences for handshaking and encryption as described above may be rearranged or modified to comply with local laws or otherwise facilitate better implementation. In addition, other cryptographic functions may be used. For example, DES-based MAC functions may be used instead of HMAC, elliptic-curve public key cryptographic functions may be used instead of RSA and Diffie-Hellman, stream ciphers such as RC4 may be used instead of block ciphers, DSS may be used instead of RSA for digital signatures, etc.

It can therefore be appreciated that a new and novel system and method for secure communications of a wide variety of types of data has been described. It will be appreciated by those skilled in the art that, given the teachings herein, numerous alternatives and equivalents will be seen to exist which incorporate the invention disclosed hereby. As a result, the invention is not to be limited by the foregoing exemplary embodiments, but only by the following claims.

We claim:

1. An apparatus for secure data communication services over a public-switched telephone network (PSTN), comprising:
 a telephony switch configured for operation on the PSTN for routing calls between a sender device and a receiver device which are configured for accessing the PSTN;
 a telephony server associated with a trusted service provider configured for controlling a telephony switch to secure the exchange of data between a sender device and a receiver device;
 wherein the telephony switch is configured for operation on the PSTN for routing calls between a sender device and a receiver device which are configured for accessing the PSTN;
 a computer within said telephony server; and
 programming executable on said computer of said telephony server for,
  authenticating said sender device and said receiver device, in response to steps comprising:
   receiving a first encrypted transmission from said sender device which includes sender authentication information and identification information for a receiver device to which secure communication is intended;
   verifying authenticity of said sender device by said telephony server;
   generating a second encrypted transmission as an authentication transmission transmitted from said telephony server to said receiver device;
   receiving authentication information back from said receiver device; and
   verifying authenticity of said receiver device by said telephony server;
  executing a secure communication service by said telephony server operating through a local exchange carrier and/or long distance carrier,
  establishing a connection over the PSTN through said telephony switch from the sender device to the receiver device for said secure communication service, and
  creating a record for billing of secure communication service performed by said telephony server over the PSTN by submitting charges to appear on the telephone bill of the call initiator, call recipient, or a third party.

2. An apparatus as recited in claim 1, wherein in response to said telephony server establishing a connection over the public switched telephone network (PSTN) from said sender device to said receiver device, said sender device and said receiver device perform a handshaking process and then communicate encrypted data between one another.

3. An apparatus as recited in claim 1:
 wherein in response to said telephony server establishing a connection over the public switched telephone network (PSTN) from said sender device to said receiver device, said sender device and said receiver device perform a handshaking process and then communicate encrypted data between one another;
 wherein said handshaking process comprises exchanging of an encryption key.

4. An apparatus as recited in claim 1, wherein said receiver device is determined in response to receiving encrypted receiver identification information from said sender device.

5. An apparatus as recited in claim 1,
 wherein said receiver device is determined in response to receiving encrypted receiver identification information from said sender device; and
 wherein said receiver identification information comprises an account number of said receiver as known by said telephony server.

6. An apparatus as recited in claim 1, wherein said telephony server is disconnected from a telephone call being routed by said routing calls and in response to said telephony server establishing said communication link between said sender device and said receiver device.

7. An apparatus as recited in claim 1, wherein telephony server is configured for caching encrypted selected data as sent by said sender device for forwarding to the receiver device at a later time to allow transfer of selected data which has been encrypted for transfer over the PSTN through said telephony switch.

8. An apparatus as recited in claim 1, wherein said billing by said system is processed through a local telephone exchange carrier.

9. An apparatus as recited in claim 1, wherein said record for billing of said secure communication service performed over the public switched telephone network (PSTN) by said system is configured for billing a call initiator, call recipient, or third party on a per-call and/or per-minute basis for use of secure communication services provided by said system.

10. An apparatus as recited in claim 1, wherein said record for billing of secure communications service is configured for submitting charges to appear on a telephone bill of a call initiator, call recipient, or third party.

11. An apparatus as recited in claim 1, wherein said record for billing of secure communications service is configured for obtaining payment from said call initiator, call recipient, or third party by an electronic payment mechanism.

12. An apparatus as recited in claim 1:
 wherein the system protects identities of communicating parties;
 wherein protection of the identity of a sender device is achieved in response to said system establishing a telephone call from said sender device to said telephony server, and not directly to said receiver device; and
 wherein protection of the identity of a receiver device is achieved in response to routing the telephone call over the public switched telephone network (PSTN), from said sender device to said receiver device, without communicating an associated telephone number of said receiver device over the PSTN.

13. An apparatus as recited in claim 1, wherein said sender device and said receiver device comprise secure modem devices (SMD) configured according to a cryptographic protocol operating in cooperation with said telephony server.

14. An apparatus as recited in claim 1, wherein said sender device is configured to automatically dial a single telephone number corresponding to said telephony server.

15. An apparatus as recited in claim 1:
wherein said sender device and said receiver device comprise digital modems;
wherein at least one telephony switch is coupled between said modems; and
wherein the telephony switch and said modems are digital, and said telephony switch connects digital outputs of said modems.

16. An apparatus as recited in claim 1, wherein said telephony switch is configured with an interface selected from the group of telephone connection interfaces consisting of T1, ISDN and ADSL.

17. An apparatus as recited in claim 1, wherein a valid account on said telephony server must be established by said sender device as a condition for verification of authenticity.

18. An apparatus as recited in claim 1, further comprising:
a computer coupled to said sender device for selecting data information, and for selecting a receiver device as recipient of said selected data; and
a computer coupled to said receiver device for controlling the receipt of selected data from said sender device.

19. An apparatus as recited in claim 1, wherein said record for billing is provided to a local exchange carrier, or local telephone service provider, which incorporates the billing into a conventional phone bill for payment by a customer.

20. An apparatus as recited in claim 1, further comprising an operator interface configured to allow a sender to select the data which is to be transferred, and for selecting a receiver of that data.

21. An apparatus as recited in claim 1, wherein said first transmission is executed in response to aggregation, compression and encryption of data selected by a sender for said sending device, and the selection of an authorized receiver.

22. An apparatus for securely exchanging selected data over a public switched telephone network (PSTN), comprising:
a telephony server configured for controlling a telephony switch adapted for routing telephone calls through the PSTN from a sender and associated sender device to a receiver and associated receiver device;
said telephony server configured for,
determining said receiver device in response to receiving encrypted receiver identification information from said sender device,
authenticating said sender device and said receiver device,
telephony server caching of encrypted selected data from said sender device,
forwarding of cached encrypted selected data to said receiver device at a later time over the PSTN through said telephony switch; and
a recording mechanism configured for creating a record for billing of communications services performed over the PSTN by said apparatus in securely communicating said selected data between sender and receiver.

23. A method of securely exchanging data between a sender device and a receiver device over a public-switched telephone network (PSTN), comprising:
selecting data to be transmitted as selected data from a sender device to a receiver device over a public-switched telephone network (PSTN);
encrypting the selected data within an enciphering unit associated with said sender device;
wherein said sender device and said receiver device are configured for communicating in an encrypted manner over said PSTN;
initiating a first transmission of sender authentication and receiver identification information over a PSTN connection to a trusted service provider on said PSTN and configured for controlling a telephony switch for routing telephone calls within said PSTN;
said first transmission containing encrypted data sufficient to authenticate the sender device and identity of the receiver device;
verifying authenticity of said sender modem by said trusted service provider on said PSTN, in response to said first transmission;
initiating from said trusted service provider, upon verification of the authenticity of the sender device, an authentication transmission to connect with said receiver device as identified within said first transmission of said sender device;
verifying the authenticity of said receiver device;
transferring the PSTN connection which is between said sender device and said trusted service provider (TSP), and under the direction of the TSP, to establish a PSTN connection from said sender device to said receiver device for direct delivery of a second transmission from said sender device containing said selected data, to said receiver device;
exchanging of encryption keys within a handshaking process between said sender device and said receiver device;
wherein said second transmission is communicated over said PSTN from said sender device to said receiver device; and
creating a record for billing of communications service performed over the PSTN in response to said method.

24. An apparatus for secure data communication services over a public-switched telephone network (PSTN), comprising:
a telephony switch configured for operation on the PSTN for routing calls between a sender device and a receiver device which are configured for accessing the PSTN;
a telephony server associated with a trusted service provider configured for controlling a telephony switch to secure the exchange of data between a sender device and a receiver device;
wherein the telephony switch is configured for operation on the PSTN for routing calls between a sender device and a receiver device which are configured for accessing the PSTN;
a computer within said telephony server; and
programming executable on said computer of said telephony server for,
authenticating said sender device and said receiver device,
wherein said receiver device is determined in response to receiving encrypted receiver identification information from said sender device,
executing a secure communication service by said telephony server operating through a local exchange carrier and/or long distance carrier,
establishing a connection over the PSTN through said telephony switch from the sender device to the receiver device for said secure communication service, and creating a record for billing of secure communication service performed by said telephony server over the PSTN by submitting charges to appear on the telephone bill of the call initiator, call recipient, or a third party.

25. An apparatus as recited in claim 24, wherein in response to said telephony server establishing a connection over the public switched telephone network (PSTN) from said sender device to said receiver device, said sender device and said receiver device perform a handshaking process and then communicate encrypted data between one another.

26. An apparatus as recited in claim 24:
wherein in response to said telephony server establishing a connection over the public switched telephone network (PSTN) from said sender device to said receiver device, said sender device and said receiver device perform a handshaking process and then communicate encrypted data between one another;
wherein said handshaking process comprises exchanging of an encryption key.

27. An apparatus as recited in claim 24, wherein said receiver identification information comprises an account number of said receiver as known by said telephony server.

28. An apparatus as recited in claim 24, wherein said telephony server is disconnected from a telephone call being routed by said routing calls in response to said telephony server establishing said communication link between said sender device and said receiver device.

29. An apparatus as recited in claim 24, wherein telephony server is configured for caching encrypted selected data as sent by said sender device for forwarding to the receiver device at a later time to allow transfer of selected data which has been encrypted for transfer over the PSTN through said telephony switch.

30. An apparatus as recited in claim 24, wherein said billing by said system is processed through a local telephone exchange carrier.

31. An apparatus as recited in claim 24, wherein said record for billing of said secure communication service performed over the public switched telephone network (PSTN) by said system is configured for billing a call initiator, call recipient, or third party on a per-call and/or per-minute basis for use of secure communication services provided by said system.

32. An apparatus as recited in claim 24, wherein said record for billing of secure communications service is configured for submitting charges to appear on a telephone bill of a call initiator, call recipient, or third party.

33. An apparatus as recited in claim 24, wherein said record for billing of secure communications service is configured for obtaining payment from said call initiator, call recipient, or third party by an electronic payment mechanism.

34. An apparatus as recited in claim 24, wherein said record for billing is provided to a local exchange carrier, or local telephone service provider, which incorporates the billing into a conventional phone bill for payment by a customer.

35. An apparatus for secure data communication services over a public-switched telephone network (PSTN), comprising:
a telephony switch configured for operation on the PSTN for routing calls between a sender device and a receiver device which are configured for accessing the PSTN;
a telephony server associated with a trusted service provider configured for controlling a telephony switch to secure the exchange of data between a sender device and a receiver device;
wherein the telephony switch is configured for operation on the PSTN for routing calls between a sender device and a receiver device which are configured for accessing the PSTN;
a computer within said telephony server; and
programming executable on said computer of said telephony server for,
authenticating said sender device and said receiver device,
executing a secure communication service by said telephony server operating through a local exchange carrier and/or long distance carrier,
establishing a connection over the PSTN through said telephony switch from the sender device to the receiver device for said secure communication service, and
creating a record for billing of secure communication service performed by said telephony server over the PSTN by submitting charges to appear on the telephone bill of the call initiator, call recipient, or a third party;
wherein said apparatus protects identities of communicating parties;
wherein protection of the identity of a sender device is achieved in response to said system establishing a telephone call from said sender device to said telephony server, and not directly to said receiver device; and
wherein protection of the identity of a receiver device is achieved in response to routing the telephone call over the public switched telephone network (PSTN), from said sender device to said receiver device, without communicating an associated telephone number of said receiver device over the PSTN.

* * * * *